(12) United States Patent
Yonezawa et al.

(10) Patent No.: US 12,732,598 B2
(45) Date of Patent: Sep. 8, 2026

(54) ILLUMINATION DEVICE

(71) Applicant: SONY GROUP CORPORATION, Tokyo (JP)

(72) Inventors: Gen Yonezawa, Kanagawa (JP); Masa Miyao, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 191 days.

(21) Appl. No.: 18/576,521

(22) PCT Filed: Mar. 10, 2022

(86) PCT No.: PCT/JP2022/010641
§ 371 (c)(1),
(2) Date: Jan. 4, 2024

(87) PCT Pub. No.: WO2023/002675
PCT Pub. Date: Jan. 26, 2023

(65) Prior Publication Data
US 2024/0340394 A1 Oct. 10, 2024

(51) Int. Cl.
*H04N 9/31* (2006.01)

(52) U.S. Cl.
CPC ................................ *H04N 9/3155* (2013.01)

(58) Field of Classification Search
CPC .. H04N 9/3111; H04N 9/3126; H04N 9/3155; H04N 9/3164
See application file for complete search history.

(56) References Cited

U.S. PATENT DOCUMENTS 7,068,789 B2 * 6/2006 Huitema ............. H04L 63/1458 713/168
7,614,069 B2 * 11/2009 Stone ............... H04N 21/25435 725/89
7,650,624 B2 * 1/2010 Barsoum ................ H04N 7/081 725/23
7,721,313 B2 * 5/2010 Barrett ............... H04N 21/4334 725/89
7,813,822 B1 * 10/2010 Hoffberg ................ H04N 7/163 381/73.1
(Continued)

FOREIGN PATENT DOCUMENTS

CN 105988268 10/2016
CN 108279548 7/2018
(Continued)

OTHER PUBLICATIONS

English Translation of International Search Report prepared by the Japan Patent Office on May 18, 2022, for International Application No. PCT/JP2022/010641, 3 pgs.

*Primary Examiner* — Michael B. Pierorazio
(74) *Attorney, Agent, or Firm* — SHERIDAN ROSS P.C.

(57) ABSTRACT

An illumination device according to the present technology includes a light source unit including a light emitting unit that emits light, a phase modulation unit that performs spatial light phase modulation on incident light from the light source unit, and a control unit that causes light from the light source unit to be incident on a plurality of areas into which a phase modulation surface of the phase modulation unit is divided at different timings for each of the areas, and starts modulation driving at a timing before a light incident period for each of the areas.

15 Claims, 31 Drawing Sheets

(56) References Cited

U.S. PATENT DOCUMENTS 8,032,911 B2 * 10/2011 Ohkita ................ H04L 61/5038 725/74
8,121,706 B2 * 2/2012 Morikawa ........... H04L 12/2814 725/74
8,949,923 B2 * 2/2015 Muvavarirwa .... H04N 21/4108 370/332
10,197,971 B1 * 2/2019 Horst ................... G11C 13/044
2003/0056093 A1 * 3/2003 Huitema ............... H04L 67/104 713/156
2004/0117856 A1 * 6/2004 Barsoum ........... G06Q 30/0207 348/E7.071
2005/0216942 A1 * 9/2005 Barton ............... H04N 21/6125 348/E7.071
2005/0283815 A1 * 12/2005 Brooks .................. H04H 20/78 725/127
2005/0289632 A1 * 12/2005 Brooks ............. H04N 7/17309 725/127
2006/0010481 A1 * 1/2006 Wall ....................... H04N 7/163 725/151
2006/0212197 A1 * 9/2006 Butler ................. B60R 11/0235 701/1
2006/0225105 A1 * 10/2006 Russ .................. H04N 7/17318 348/E7.071
2007/0050822 A1 * 3/2007 Stevens .................... H04N 7/14 725/74
2007/0079341 A1 * 4/2007 Russ ................ H04N 21/43615 725/89
2007/0101185 A1 * 5/2007 Ostrowka .......... H04N 21/4334 714/6.13
2007/0130601 A1 * 6/2007 Li ...................... H04N 21/6405 725/112
2007/0157281 A1 * 7/2007 Ellis ................... H04N 21/4147 725/74
2008/0013919 A1 * 1/2008 Boston ................... G11B 19/00
2008/0022330 A1 * 1/2008 Barrett ............... H04N 21/8352 725/89
2008/0022331 A1 * 1/2008 Barrett ............... H04N 21/6125 725/89
2008/0022332 A1 * 1/2008 Barrett ............... H04N 21/4227 725/89
2008/0155615 A1 * 6/2008 Craner ............... H04N 7/17318 348/E7.071
2008/0221734 A1 * 9/2008 Nagao .................... G06V 10/56 706/20
2008/0235587 A1 * 9/2008 Heie ...................... H04N 7/142 709/231
2008/0235733 A1 * 9/2008 Heie .................... H04N 21/482 725/46
2009/0162032 A1 * 6/2009 Patel .................. H04N 21/8355 386/353
2010/0107186 A1 * 4/2010 Varriale ................. H04H 60/23 455/410
2010/0125876 A1 * 5/2010 Craner ............... H04N 21/4331 725/37
2010/0263013 A1 * 10/2010 Asakura ............... H04N 21/443 725/116
2010/0296487 A1 * 11/2010 Karaoguz ............. H04W 36/04 370/332
2010/0313225 A1 * 12/2010 Cholas ............... H04N 21/4402 725/62
2010/0313226 A1 * 12/2010 Cholas ............. H04N 21/25875 725/98
2011/0066744 A1 * 3/2011 Del Sordo ......... H04N 21/4305 709/231
2011/0086619 A1 * 4/2011 George ............. H04M 1/72415 455/414.1
2011/0103374 A1 * 5/2011 Lajoie ................... H04L 65/612 370/352
2011/0107364 A1 * 5/2011 Lajoie ................. H04L 65/1023 370/352
2011/0107379 A1 * 5/2011 Lajoie ................... H04L 65/611 725/151
2011/0191810 A1 * 8/2011 Thomas ................. H04N 7/106 725/78
2012/0230649 A1 * 9/2012 Craner ............... H04N 21/4532 386/230
2013/0198787 A1 * 8/2013 Perry, II ............. H04N 21/2585 725/86
2016/0295178 A1 10/2016 Damberg et al.
2017/0048502 A1 2/2017 Guo et al.
2017/0099466 A1 4/2017 Damberg et al.
2017/0109584 A1 * 4/2017 Yao .................... H04N 21/4666
2017/0127025 A1 5/2017 Damberg et al.
2017/0254932 A1 * 9/2017 Huang ...................... G02F 1/21
2018/0150704 A1 * 5/2018 Lee ........................ G06V 10/82
2019/0108618 A1 * 4/2019 Hwang ................ G06N 3/0464
2019/0222891 A1 * 7/2019 Shen ................ H04N 21/25875
2020/0196024 A1 * 6/2020 Hwang .................. G06N 3/044
2020/0211229 A1 * 7/2020 Hwang ..................... G06T 3/06
2020/0336713 A1 10/2020 Davies
2021/0326690 A1 * 10/2021 Pégard ................... G06V 10/88
2023/0043791 A1 * 2/2023 Supikov ............... G03H 1/0866
2023/0205133 A1 * 6/2023 Matusik ................... G03H 1/04 359/9
2023/0368012 A1 * 11/2023 Yu ........................... G02B 5/18

FOREIGN PATENT DOCUMENTS

JP 2017-505555 2/2017
JP 2017-519236 7/2017
JP 2018-532152 11/2018
JP 2021-039346 3/2021
WO WO-2017059537 A1 4/2017
WO WO-2020190823 A1 9/2020
WO WO 2021/132059 7/2021

* cited by examiner

FIG. 6

IRRADIATION REGION
ux
uy
PHASE MODULATABLE REGION
x
DOMAIN Dm
x'
y'
Δx
y
Δy
f

Sp
(ux, uy) COORDINATE AXIS
POINT B'
INTENSITY DISTRIBUTION I'
PHASE DISTRIBUTION P'
ON DOMAIN Dm
Sm
(x', y') COORDINATE AXIS
DOMAIN Dm
POINT A'

FIG. 9

TARGET LIGHT INTENSITY DISTRIBUTION
Sp
Rc
Dpd-2
Dpd-1
Dpd-3
Sm
Ar
Dpa1
Dpa2
Dpa3
Dm-2
Dm-3
Dm-1
Dpl-2
Dpl-3
Dpl-1

F
F
F
F
F
F
INTENSITY MODULATION SLM
INTENSITY MODULATION SLM
PHASE MODULATION SLM (FIRST AREA)
PHASE MODULATION SLM (SECOND AREA)
Yellow LIGHT SOURCE
Blue LIGHT SOURCE
Red IMAGE
Green IMAGE
Blue IMAGE Sc
7
Sp
6
5
4
3
2
2r
2g
2b
20
20
20
20
LIGHT SOURCE CONTROL UNIT
9
LIGHT ENTRANCE CONTROL UNIT
15
DRIVE CONTROL UNIT
12
13
DRIVE CONTROL UNIT
PHASE PATTERN CALCULATION UNIT
11
14
INTENSITY PATTERN CALCULATION UNIT
8B (CONTROL UNIT)
TARGET INTENSITY DISTRIBUTION CALCULATION UNIT
10
1B (PROJECTOR DEVICE)
IMAGE DATA Sc
7
Sp
6
5
4
3
2C
2y
2c
8C (CONTROL UNIT)
1C (PROJECTOR DEVICE)
DRIVE CONTROL UNIT
INTENSITY PATTERN CALCULATION UNIT
13
14
DRIVE CONTROL UNIT
12
PHASE PATTERN CALCULATION UNIT
11
TARGET INTENSITY DISTRIBUTION CALCULATION UNIT
10
LIGHT SOURCE CONTROL UNIT
9
IMAGE DATA

FIG. 22

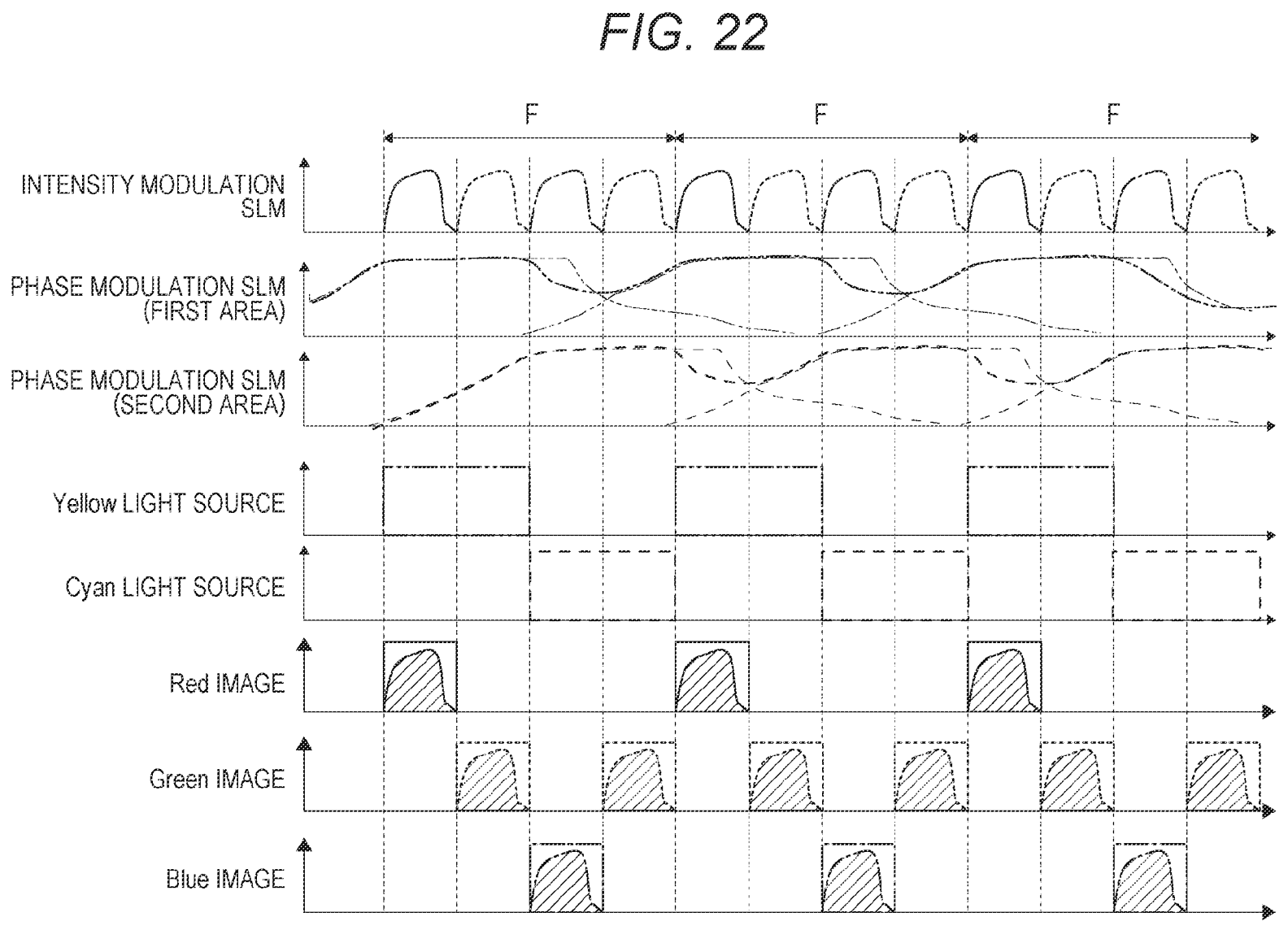

INTENSITY MODULATION SLM
PHASE MODULATION SLM (FIRST AREA)
PHASE MODULATION SLM (SECOND AREA)
Yellow LIGHT SOURCE
Cyan LIGHT SOURCE
Red IMAGE
Green IMAGE
Blue IMAGE
F
F
F Sc
Sp
7
6
5
4
3
20
2
2r
2g
2b
Ar1
Ar2
Ar3
Ar4
8D (CONTROL UNIT)
1D (PROJECTOR DEVICE)
DRIVE CONTROL UNIT
13
INTENSITY PATTERN CALCULATION UNIT
14
DRIVE CONTROL UNIT
12
PHASE PATTERN CALCULATION UNIT
11
TARGET INTENSITY DISTRIBUTION CALCULATION UNIT
10
LIGHT ENTRANCE CONTROL UNIT
15'
LIGHT SOURCE CONTROL UNIT
9
IMAGE DATA

FIG. 26

Sp
Ar1
Ar2
Sm
Y(R/G) LIGHT
B LIGHT

FIG. 27

Sp
Ar1
Ar2
Ar3
R LIGHT
B LIGHT
G LIGHT
Sm

LIGHT SOURCE UNIT
30
31a
31b
31
32
32a
32b
33
34
35
36
37
Sc
Sp
7
6
5
4
3
2
2r
2g
2b
8 (CONTROL UNIT)
1E (PROJECTOR DEVICE)
DRIVE CONTROL UNIT
13
INTENSITY PATTERN CALCULATION UNIT
14
DRIVE CONTROL UNIT
12
PHASE PATTERN CALCULATION UNIT
11
TARGET INTENSITY DISTRIBUTION CALCULATION UNIT
10
LIGHT SOURCE CONTROL UNIT
9
IMAGE DATA

FIG. 31

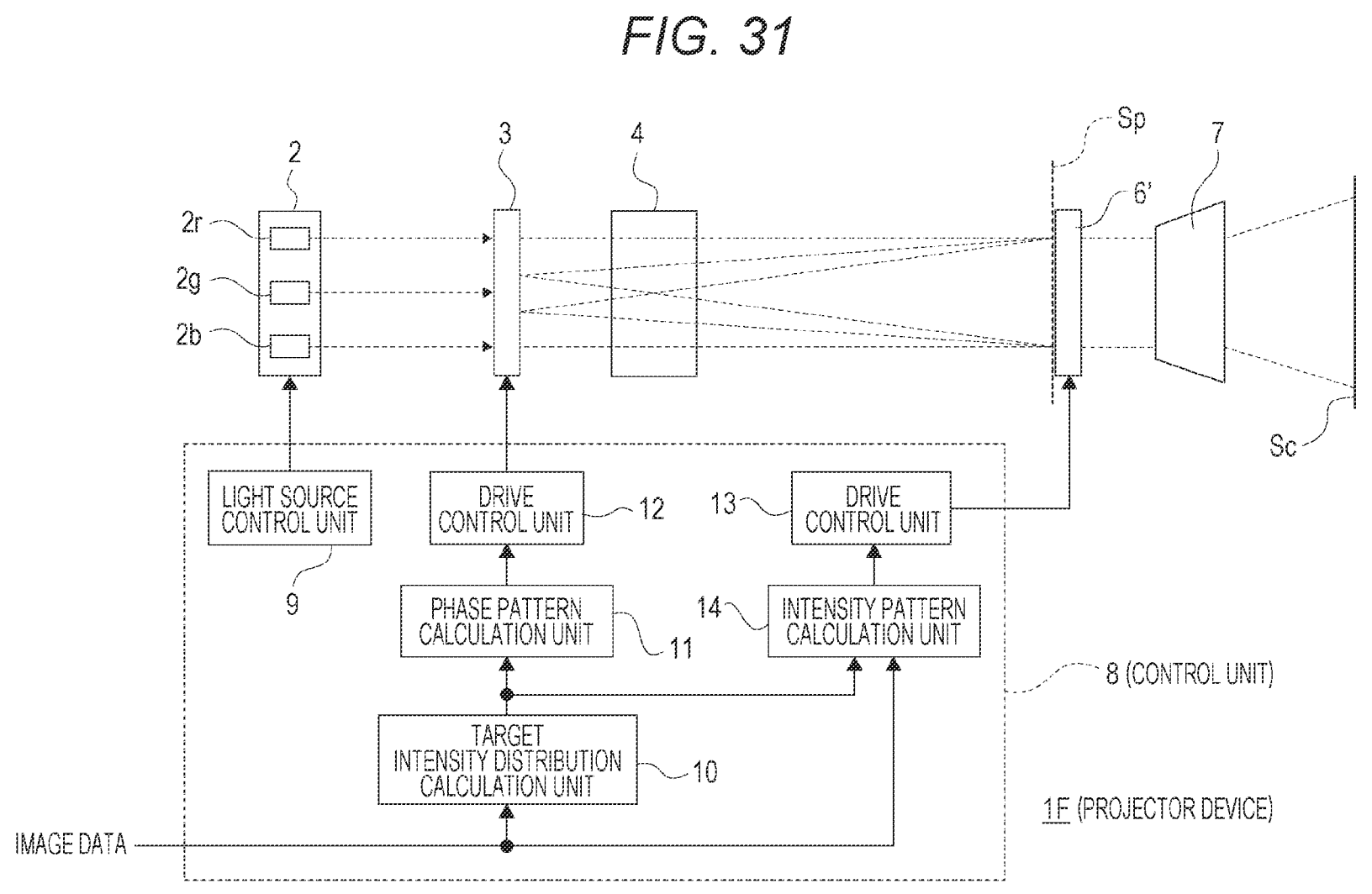

Sc
7
Sp
6'
8 (CONTROL UNIT)
1F (PROJECTOR DEVICE)
4
3
2
2r
2g
2b
LIGHT SOURCE CONTROL UNIT
9
DRIVE CONTROL UNIT
12
PHASE PATTERN CALCULATION UNIT
11
TARGET INTENSITY DISTRIBUTION CALCULATION UNIT
10
DRIVE CONTROL UNIT
13
INTENSITY PATTERN CALCULATION UNIT
14
IMAGE DATA

ILLUMINATION DEVICE

CROSS REFERENCE TO RELATED APPLICATIONS

This application is a national stage application under 35 U.S.C. 371 and claims the benefit of PCT Application No. PCT/JP2022/010641, having an international filing date of 10 Mar. 2022, which designated the United States, which PCT application claimed the benefit of Japanese Patent Application No. 2021-120862, filed 21 Jul. 2021, the entire disclosures of each of which are incorporated herein by reference.

TECHNICAL FIELD

The present technology relates to an illumination device for obtaining illumination light, and particularly relates to an illumination device for obtaining illumination light having a desired light intensity distribution by applying spatial light phase modulation to incident light from a light source unit.

BACKGROUND ART

In recent years, in the field of image display devices, technologies for increasing a dynamic range have been proposed, and in particular, a high dynamic range (HDR) standard has attracted attention. The HDR standard is an image signal format in which gradation representation of a low luminance portion is expanded and peak luminance is high. In conventional image signal formats, luminance expression is up to about 100 cd/$m^2$ (candela per square meter), but at present, there is an increasing demand for high luminance expression several tens of times higher than the luminance expression.

Patent Document 1 below discloses a technology in which a laser light source and a spatial light phase modulator (hereinafter also referred to as a "phase modulator") for modulating a phase of light are used to steer a light beam emitted from the laser light source in accordance with an image signal, and light of a dark object is collected to a bright object to generate projector illumination light in accordance with a luminance distribution of the image. A method is proposed for implementing an image with a wide dynamic range by making the illumination light incident on a spatial light intensity modulator (hereinafter also referred to as an "intensity modulator") such as a digital micro mirror device (DMD).

Here, it can be said that the method of making the illumination light generated by the phase modulator incident on the intensity modulator as described above aims at an effect similar to that of performing, for example, area division driving of backlight in a liquid crystal television (television receiver).

CITATION LIST

Patent Document

Patent Document 1: Japanese Unexamined Patent Application Publication No. 2018-532152

SUMMARY OF THE INVENTION

Problems to be Solved by the Invention

Here, in order to generate an image to which a desired light intensity distribution is given using the phase modulator, it may be necessary to modulate the phase of light by 2π or more.

As a phase modulator capable of modulating the phase of light by 2π or more, a device using liquid crystal, liquid crystal on silicon (LCOS), is currently the mainstream. In general, it is necessary to increase the phase difference in order to modulate the phase by 2π or more, and this is implemented by using a liquid crystal material having a large refractive index difference Δn or by doubling the thickness of a liquid crystal layer. The refractive index difference Δn is about 1.5 at most in a conventional liquid crystal material in which the modulation amount is π, whereas a liquid crystal material in which the refractive index difference Δn is large is currently about Δn=2.0, which is not twice as large. Furthermore, when the refractive index difference Δn is increased, the reliability of the liquid crystal material itself is lowered, and thus there is a hurdle before practical use. That is, in order to modulate the phase by 2π or more, a design in which a thickness d of the liquid crystal layer is twice or more is more realistic.

On the other hand, it is known that the response speed of the liquid crystal panel decreases depending on the thickness d of the liquid crystal layer, and the response speed becomes $2^{2=4}$ times when the thickness d becomes 2 times. In a case of the current LCOS, a realistic speed is around 10 msec, and thus the phase modulator that modulates the phase by 2π or more has an operation speed of about 40 msec. This means that a response to 60 fps (16 msec), which is a general frame rate, cannot be completed, and in a case where such a phase modulator is used, crosstalk in a time direction occurs in illumination light used as backlight (a reproduced image functioning as backlight), which causes deterioration in image quality of a projected image.

In order to prevent the occurrence of crosstalk caused by the response speed of the phase modulator as described above, for example, as disclosed in Patent Document 1, it is conceivable to provide a plurality of phase modulators and use the plurality of phase modulators in a time division manner, but providing a plurality of phase modulators leads to an increase in size of the optical system, which is not desirable.

The present technology has been made in view of the above circumstances, and an object thereof is to achieve both downsizing of an optical system and reduction of crosstalk in a time direction of a reproduced image in an illumination device that obtains a reproduced image for illumination by applying spatial light phase modulation to incident light from a light source unit.

Solutions to Problems

An illumination device according to the present technology includes a light source unit including a light emitting unit that emits light, a phase modulation unit that performs spatial light phase modulation on incident light from the light source unit, and a control unit that causes light from the light source unit to be incident on a plurality of areas into which a phase modulation surface of the phase modulation unit is divided at different timings for each of the areas, and starts modulation driving at a timing before a light incident period for each of the areas.

Thus, the phase modulation unit can output a reproduced image that is different for each area in a time division manner.

BRIEF DESCRIPTION OF DRAWINGS

FIG. 6 is an explanatory diagram of a coordinate system of a phase modulatable region and a domain on a phase modulation surface and a coordinate system of an irradiation region on an intensity modulation surface.

FIG. 9 is an explanatory diagram of addition of a lens component to a scaled phase distribution.

FIG. 22 is an explanatory diagram of a control method as the third embodiment.

FIG. 26 is an explanatory diagram of uneven division of an area.

FIG. 27 is a diagram illustrating a layout example of areas of respective colors.

FIG. 31 is an explanatory diagram of an illumination device as a modification using a transmissive spatial light intensity modulator.

MODE FOR CARRYING OUT THE INVENTION

Hereinafter, embodiments according to the present technology will be described in the following order with reference to the accompanying drawings.

<1. First embodiment>

(1-1. Configuration of illumination device)

(1-2. Control method as first embodiment)

(1-3. Phase modulation)

(1-4. Specific control method)

<2. Second Embodiment>

<3. Third Embodiment>

<4. Fourth Embodiment>

<5. Modifications>

<6. Summary of embodiments>

<7. Present technology>

1. First Embodiment (1-1. Configuration of Illumination Device)

Figure 1:
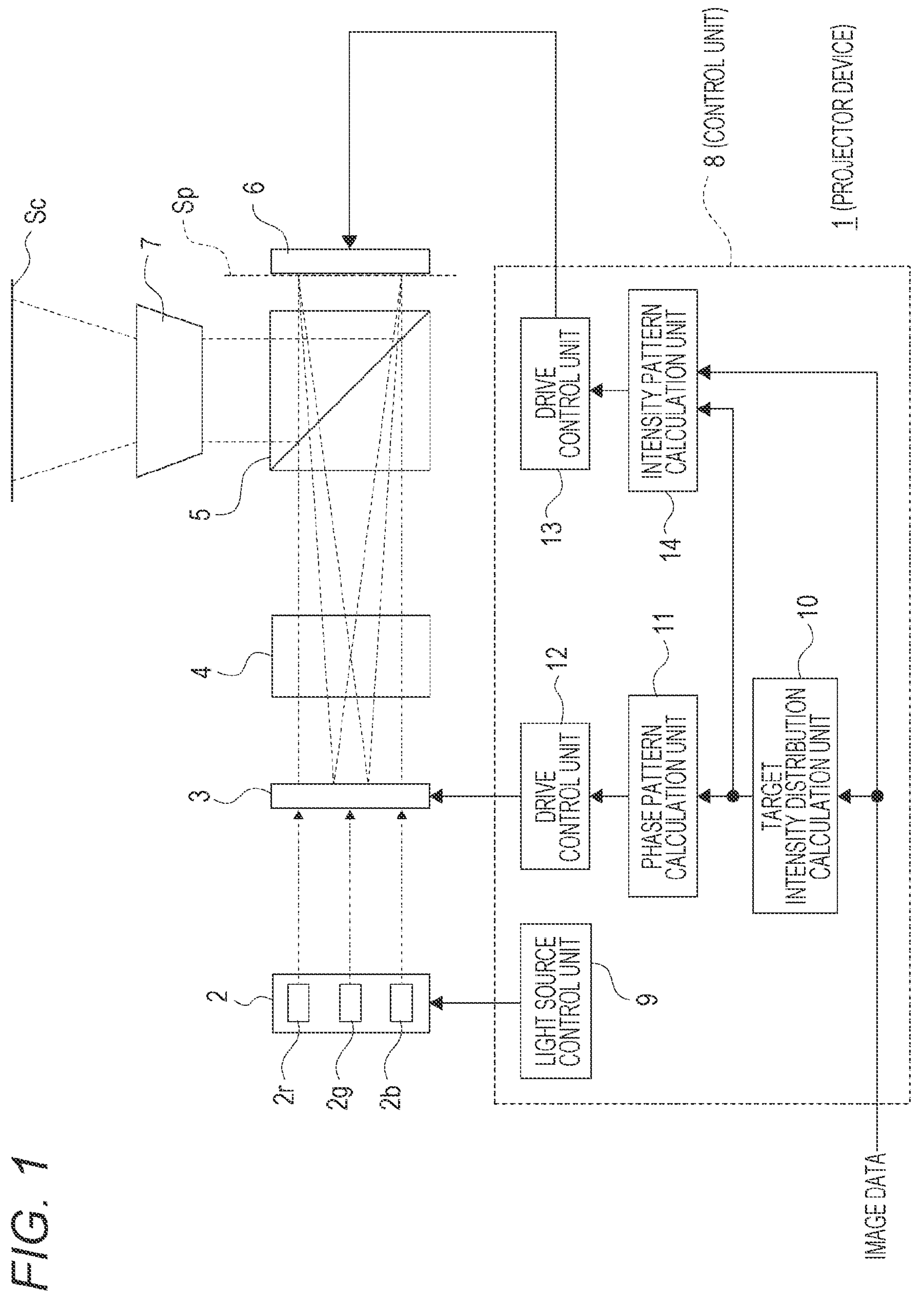
FIG. 1 is a diagram illustrating a configuration example of an illumination device as a first embodiment according to the present technology.

FIG. 1 is a diagram illustrating a configuration example of a projector device 1 as a first embodiment of an illumination device according to the present technology.

As illustrated in the drawing, the projector device 1 includes a light source unit 2, a phase modulation spatial light modulator (SLM) 3, a relay optical system 4, a prism 5, a phase modulation spatial light modulator (SLM) 6, a projection lens 7, and a control unit 8.

The projector device 1 is configured such that the phase modulation SLM 3 performs spatial light phase modulation on incident light from the light source unit 2 to reproduce a desired image (light intensity distribution) on an intensity modulation surface Sp of the intensity modulation SLM 6. That is, projector illumination light corresponding to a luminance distribution of an image is generated by collecting light of a dark object in an image to be displayed on a bright object, thereby expanding the dynamic range as compared with a case of generating a projected image only by spatial light intensity modulation by the intensity modulation SLM 6.

Here, for confirmation, the principle of image reproduction by the spatial light phase modulation will be described with reference to FIG. 2.

Figure 2:
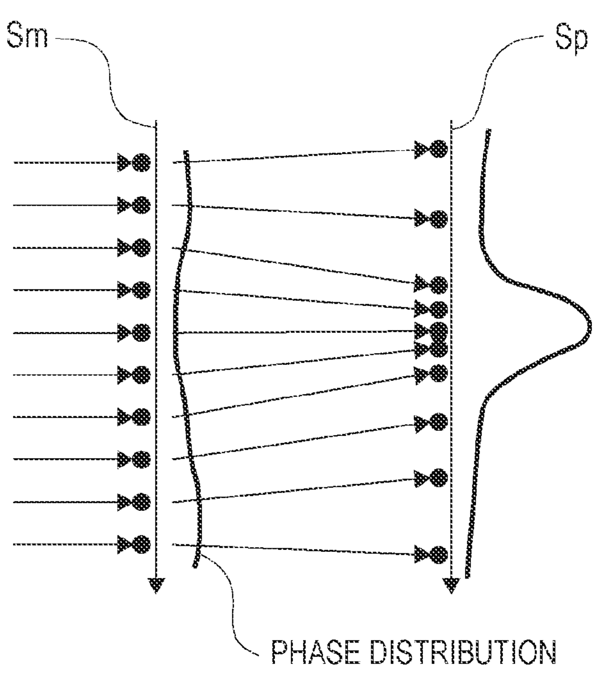
FIG. 2 is an explanatory diagram of a principle of image reproduction by spatial light phase modulation.

FIG. 2 schematically illustrates a relationship among each light beam incident on a phase modulation surface Sm of the phase modulation SLM 3, a wavefront of a phase distribution in the phase modulation SLM 3, each light beam after phase modulation, and a light intensity distribution formed on the intensity modulation surface Sp by each light beam after the phase modulation.

First, as a premise, the wavefront of the phase distribution in the phase modulation SLM 3 draws a smooth curve as illustrated by using a freeform method. By the spatial light phase modulation in the phase modulation SLM 3, each incident light beam is refracted so as to travel in the normal direction of the wavefront of the phase distribution. Due to this refraction, a portion where light density increases and a portion where light beam density becomes sparse are formed on the intensity modulation surface Sp, thereby forming a light intensity distribution on the intensity modulation surface Sp.

According to such a principle, it is possible to reproduce a desired image on the intensity modulation surface Sp by the pattern of the phase distribution set in the phase modulation SLM 3.

In a conventional projector device, an image is generated by applying the spatial light intensity modulation by the intensity modulation SLM to light from a light source, but in the spatial light intensity modulation, a part of incident light from the light source is shielded or dimmed, and hence there is a circumstance that utilization efficiency of light is low and it is difficult to achieve high contrast. By performing reproduced image generation by the spatial light phase modulation as described above, it is possible to collect light of a dark object to be shielded or dimmed to a bright object, so that the utilization efficiency of light can be improved, and high contrast (expansion of the dynamic range) can be achieved.

In FIG. 1, the light source unit 2 functions as a light source of incident light to the phase modulation SLM 3. In the present example, a light source unit 2 includes a light emitting unit 2*r*, a light emitting unit 2*g*, and a light emitting unit 2*b* each configured to emit light of different colors. The light emitting unit 2*r* emits red (R) light, the light emitting unit 2*g* emits green (G) light, and the light emitting unit 2*b* emits blue (B) light.

In the present example, for example, a laser light emitting element is used as the light emitting element of the light emitting units 2*r*, 2*g*, and 2*b*.

The phase modulation SLM 3 includes a transmission type liquid crystal panel, and performs the spatial light phase modulation on incident light.

Note that details of the spatial light phase modulation by the phase modulation SLM 3 in the embodiment will be described later again.

The relay optical system 4 guides the light subjected to the spatial light phase modulation by the phase modulation SLM 3 to the prism 5.

As illustrated, the light emitted from the relay optical system 4 is incident on the intensity modulation surface Sp of the intensity modulation SLM 6 via the prism 5.

The intensity modulation SLM 6 is, for example, liquid crystal on silicon (LCOS), and performs the spatial light intensity modulation on incident light.

Note that a digital micro mirror device (DMD) can also be used as the intensity modulation SLM 6. Furthermore, in a case of a transmission type, for example, a transmission type liquid crystal panel can also be used.

The light subjected to the spatial light intensity modulation by the intensity modulation SLM 6 is reflected by a reflection surface of the prism 5 and is incident on the projection lens 7.

The projection lens 7 projects the light subjected to the spatial light intensity modulation by the intensity modulation SLM 6 onto an object such as a screen Sc, thereby projecting a reproduced image corresponding to an input image onto the object.

Figure 3:
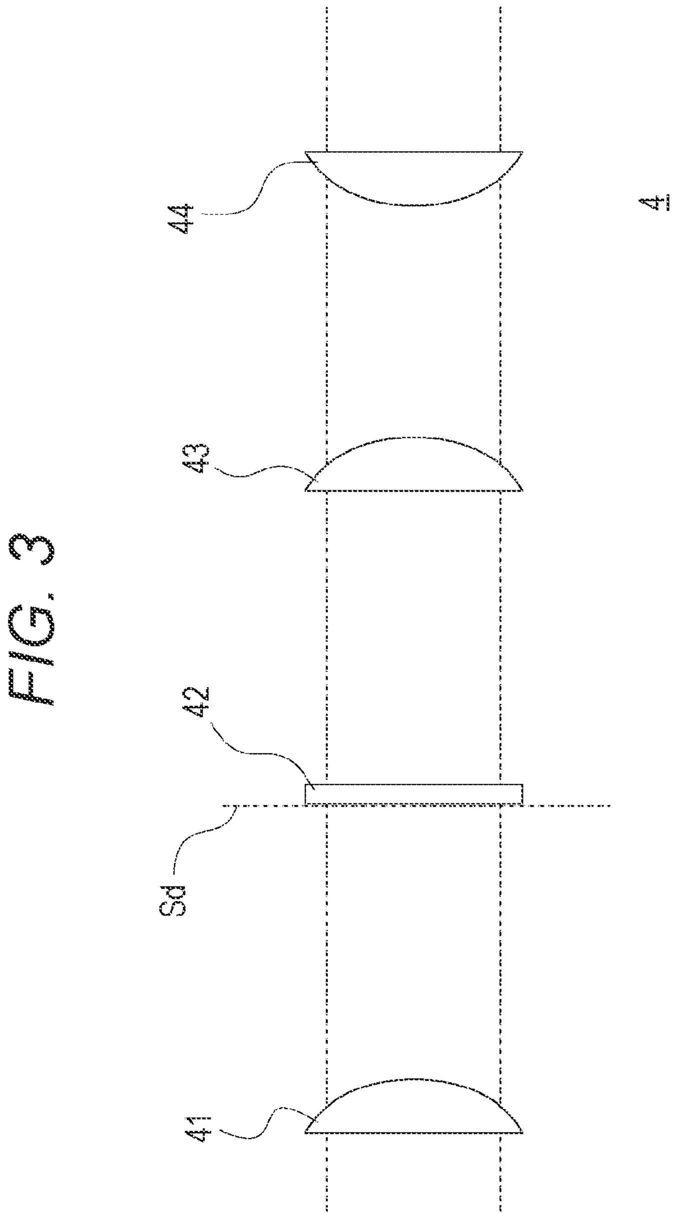
FIG. 3 is a diagram illustrating a configuration example of a relay optical system 4 included in the illumination device as the embodiment.

Here, a configuration example of the relay optical system 4 will be described with reference to FIG. 3.

In the relay optical system 4, a lens 41, a diffusion plate 42, a lens 43, and a lens 44 are provided. The lens 41, the diffusion plate 42, the lens 43, and the lens 44 are arranged in this order from the phase modulation SLM 3 to the prism 5 side.

Each light beam emitted from the phase modulation SLM 3 is incident on the diffusion plate 42 via the lens 41. The diffusion plate 42 is disposed on a dummy surface Sd. The dummy surface Sd is a surface having a conjugate relationship with the intensity modulation surface Sp in the intensity modulation SLM 6 and the projection target surface (the surface of the screen Sc in this example) by the projection lens 7.

The light through the diffusion plate 42 enters the prism 5 illustrated in FIG. 1 through the lens 43 and the lens 44.

Here, on the dummy surface Sd, a reproduced image by the phase modulation SLM 3 is obtained as on the intensity modulation surface Sp. Although not illustrated in detail, each light beam emitted from the phase modulation SLM 3 is focused on the dummy surface Sd, but the diffusion plate 42 provided on the dummy surface Sd reduces etendue (light flux cross-sectional area) on the dummy surface Sd, and improves safety for eyes and skin.

Note that the configuration of the optical system in the projector device 1 is not limited to this, and an image can be generated on the intensity modulation surface Sp without passing through the diffusion plate 42.

The description is returned to FIG. 1.

The control unit 8 includes a light source control unit 9, a target intensity distribution calculation unit 10, a phase pattern calculation unit 11, a drive control unit 12, a drive control unit 13, and an intensity pattern calculation unit 14.

The light source control unit 9 performs light emission operation control of the light emitting unit included in the light source unit 2. Specifically, in the present example, ON/OFF control (light emission/non-light emission control) is performed for each of the light emitting units 2*r*, 2*g*, and 2*b* provided in the light source unit 2.

The drive control unit 12 includes a drive circuit for driving the phase modulation SLM 3. The drive control unit 12 is configured to be able to individually drive each pixel of the phase modulation SLM 3.

Similarly, the drive control unit 13 includes a drive circuit for driving the intensity modulation SLM 6, and is capable of individually driving each pixel of the intensity modulation SLM 6.

The target intensity distribution calculation unit 10 performs processing of obtaining a light intensity distribution of a reproduced image generated on the intensity modulation surface Sp as a target intensity distribution on the basis of image data. The calculation of the target intensity distribution is performed at least in units of frames, and in a case where subframes for each color such as R, G, and B are to be displayed within one frame period, for example, the target intensity distribution is calculated for each color.

As described above, the reproduced image generated on the intensity modulation surface Sp corresponds to backlight light of area division driving in a liquid crystal television (television receiver) or the like, and the target intensity distribution mentioned here is close to an image of extracting low-frequency components of an input image.

The phase pattern calculation unit 11 calculates a phase modulation pattern (phase distribution: information indicating a phase of each pixel) to be set in the phase modulation SLM 3 on the basis of the target intensity distribution calculated by the target intensity distribution calculation unit 10.

Note that the phase modulation pattern for achieving the target intensity distribution is calculated on the basis of the freeform method in this example, but details thereof will be described later again.

The drive control unit 13 drives the phase modulation SLM 3 according to the phase modulation pattern calculated by the phase pattern calculation unit 11.

The intensity pattern calculation unit 14 calculates an intensity modulation pattern to be set in the intensity modulation SLM 6 on the basis of image data and the target intensity distribution calculated by the target intensity distribution calculation unit 10. In the present example, the spatial light intensity modulation by the intensity modulation SLM 6 corresponds to imparting a high-frequency component to the reproduced image to be output to the intensity modulation surface Sp by the phase modulation SLM 3, and the calculation of the intensity modulation pattern here is close to an image of extracting high-frequency components of input image data on the basis of the input image data and the target intensity distribution (corresponding to low-frequency components of the image).

In a case where subframe images of a plurality of colors are to be displayed within one frame period, the intensity pattern calculation unit 14 calculates the intensity modulation pattern for each of the subframe images.

The drive control unit drives the intensity modulation SLM 6 according to the intensity modulation pattern calculated by the intensity pattern calculation unit 14.

(1-2. Control Method as First Embodiment)

Here, in order to generate an image to which a desired light intensity distribution is given using the phase modulation SLM, it may be necessary to modulate the phase of light by 2π or more, and for this purpose, it is demanded that the thickness d of the liquid crystal layer of the phase modulation SLM is twice or more as compared with conventional cases.

However, the response speed of the liquid crystal panel is reduced by the thickness d.

Figure 4A:
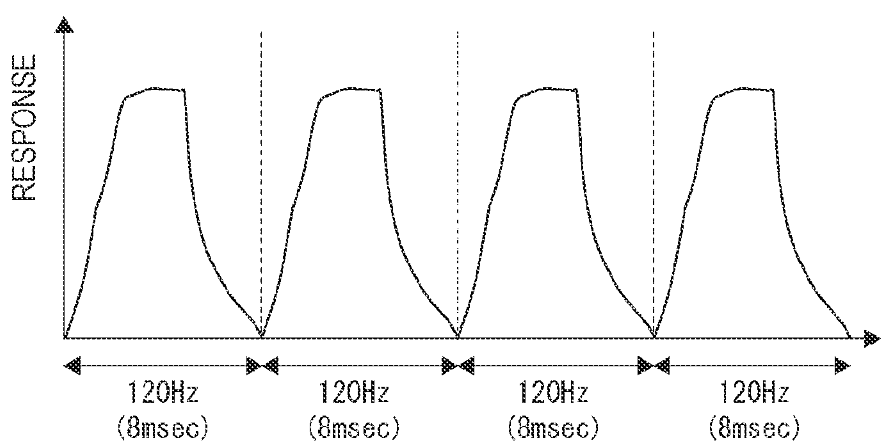
FIG. 4A is a diagram for describing dependence of response speed of a liquid crystal panel on a thickness.
Figure 4B:
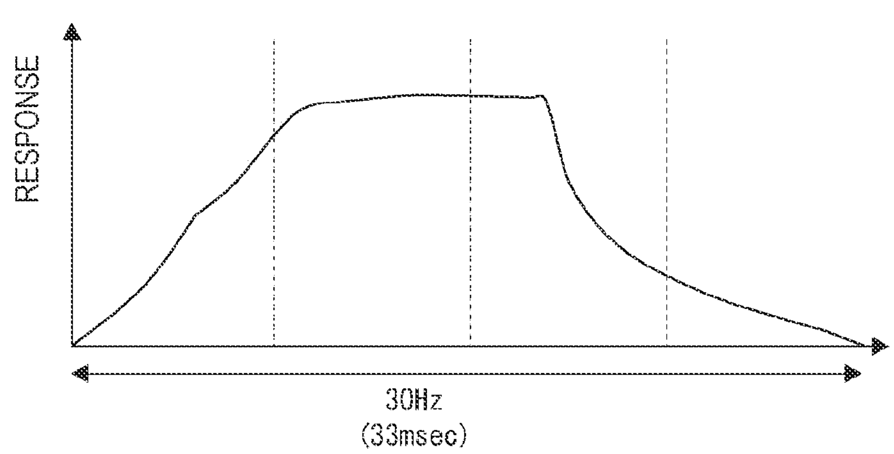
FIG. 4B is a diagram for describing dependence of response speed of a liquid crystal panel on a thickness.

FIGS. 4A and 4B are diagrams for describing the dependence of the response speed of the liquid crystal panel on the thickness d, and illustrates a response characteristic (FIG. 4A) of the intensity modulation SLM with the general thickness d and a response characteristic (FIG. 4B) of the phase modulation SLM with the thickness d made about twice as thick as the intensity modulation SLM.

For this reason, there is a possibility that the phase modulation SLM cannot respond to 60 fps (16 msec), which is a general frame rate, and crosstalk in the time direction occurs with respect to the illumination light (reproduced image) with which the intensity modulation surface Sp is irradiated, which causes a decrease in image quality of the projected image.

In order to prevent the occurrence of crosstalk caused by the response speed of the phase modulation SLM as described above, it is conceivable to provide a plurality of phase modulation SLMs and use the plurality of phase modulation SLMs in a time division manner, but it is not desirable to provide a plurality of phase modulation SLMs because this leads to an increase in size of the optical system.

Therefore, in the present embodiment, a method is employed in which the phase modulation surface Sm in the phase modulation SLM 3 is divided into a plurality of areas Ar, light from the light source unit 2 is made incident at different timings for each of the areas Ar, and modulation driving is started at a timing before a light incident period for each of the areas Ar.

In the present example, it is assumed that subframes of three colors of R, G, and B are output within one frame period, and corresponding to this, the light source unit 2 is provided with light emitting units 2*r*, 2*g*, and 2*b*.

In the present example, in each of subframe periods of R, G, and B, the intensity modulation surface Sp is irradiated with the reproduced image from each of different areas Ar of the phase modulation SLM 3. Specifically, the intensity modulation surface Sp is irradiated with a reproduced image from a certain area Ar of the phase modulation SLM 3 in the subframe period of R, and the intensity modulation surface Sp is irradiated with a reproduced image from another area Ar of the phase modulation SLM 3 in the subframe period of G. Moreover, the intensity modulation surface Sp is irradiated with a reproduced image from still another area Ar of the phase modulation SLM 3 in the subframe period B.

Therefore, in the present example, the phase modulation surface Sm in the phase modulation SLM 3 is divided into three. The three divided areas Ar are a first area Ar1, a second area Ar2, and a third area Ar3.

Furthermore, in the present example, the optical system is configured such that the intensity modulation surface Sp is irradiated with a reproduced image by R light in the subframe period of R, a reproduced image by G light in the subframe period of G, and a reproduced image by B light in the subframe period of B, and light from the light emitting unit 2*r*, light from the light emitting unit 2*g*, and light from the light emitting unit 2*b* are incident on the first area Ar1, the second area Ar2, and the third area Ar3, respectively.

Figures 5A, 5B, 5C:
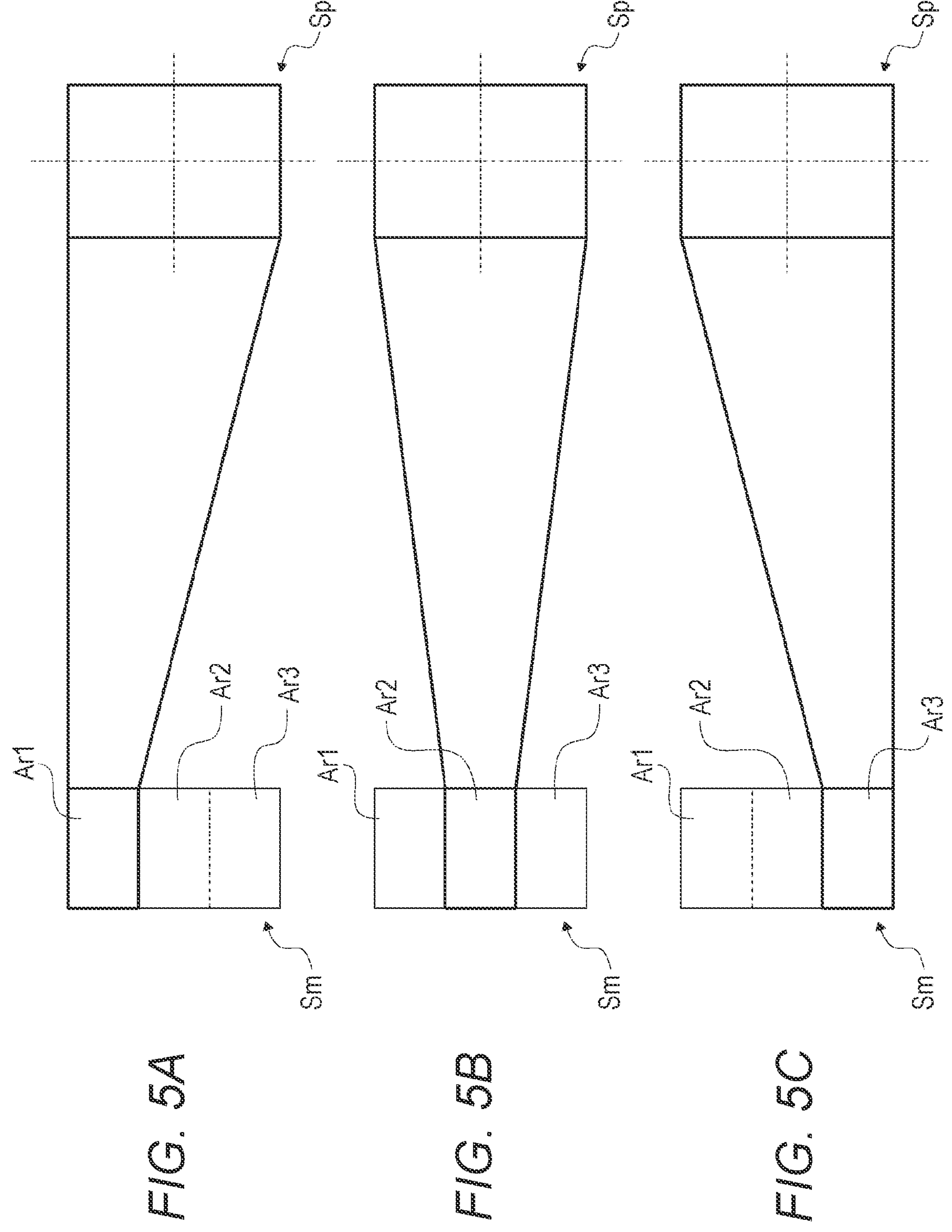
FIG. 5A is a diagram illustrating an emission image of a reproduced image for each area in the first embodiment.
FIG. 5B is a diagram illustrating an emission image of a reproduced image for each area in the first embodiment.
FIG. 5C is a diagram illustrating an emission image of a reproduced image for each area in the first embodiment.

FIGS. 5A-5C illustrate emission images of a reproduced image for each area Ar in the first embodiment.

As illustrated in FIGS. 5A to 5C, in order not to cause crosstalk in a spatial direction with respect to the reproduced image, light is emitted from each area Ar such that the same region on the intensity modulation surface Sp is irradiated with each reproduced image.

For this purpose, it is sufficient if spatial light phase modulation is performed in each area Ar so as to provide a lens effect for changing at least one of the direction or the light flux size of emitted light flux from each area Ar (from the light flux before being incident on each area Ar).

(1-3. Phase Modulation)

Hereinafter, a method of deriving a phase modulation pattern for reproducing a desired light intensity distribution on the intensity modulation surface Sp including the above-described lens effect will be described with reference to FIGS. 6 to 9.

As described above, as a method for obtaining a phase distribution for reproducing a target light intensity distribution, the freeform method is known. The freeform method is a generic term for a method of obtaining a phase distribution for reproducing a desired image on the basis of ray optics.

Hereinafter, a method for obtaining the phase distribution for each area Ar on the basis of the freeform method will be described. Note that, in the following description, a concept of "domain Dm" is used, and this is a concept corresponding to "area Ar".

Figure 6:
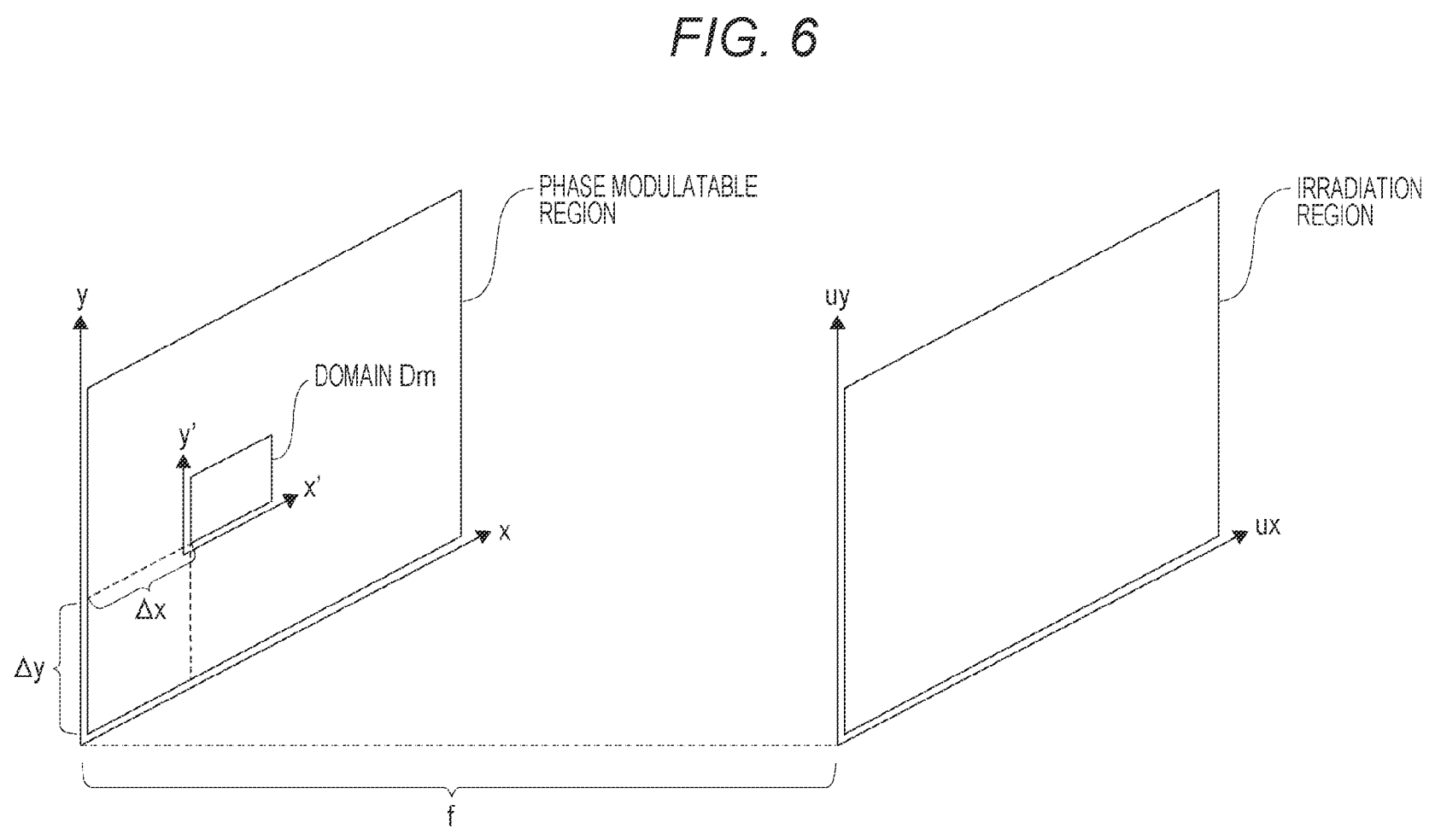

First, as illustrated in FIG. 6, here, for convenience of description, a coordinate system (x, y) in the phase modulatable region on the phase modulation surface Sm, a coordinate system (x', y') in the domain Dm of the phase modulation surface, and a coordinate system (ux, uy) in an irradiation region (region irradiated with the reproduced image) on the intensity modulation surface Sp are defined. Furthermore, a shift amount of the position of the domain Dm with respect to the phase modulatable region is set to (Δx, Δy), and an area reduction magnification of the domain Dm with respect to the phase modulatable region is set to r (r>2). Furthermore, a distance between the phase modulation surface Sm and the intensity modulation surface Sp is defined as f.

A phase distribution P in which light beams are associated one-to-one from the entire phase modulatable region to the irradiation region is obtained by the freeform method. A refraction effect that a light beam incident on the point (x, y)=($x_1$, $y_1$) on the phase modulatable region receives from the phase distribution P is determined by a gradient vector,

[Math. 1]

$$\left(\frac{\partial P}{\partial x}, \frac{\partial P}{\partial y}\right)\Big|_{x=x_1, y=y_1} \quad \text{[Expression 1]}$$

of the phase distribution P at the point (x, y)=($x_1$, $y_1$), and a displacement in an in-plane direction between the point (ux, uy)=($ux_1$, $uy_1$) at which the light beam penetrates the projection plane and the point (x, y)=($x_1$, $y_1$) on the phase modulation surface Sm is given by the following [Expression 2] as the product of the gradient vector and a distance f.

[Math. 2]

$$\begin{pmatrix} ux_1 \\ uy_1 \end{pmatrix} - \begin{pmatrix} x_1 \\ y_1 \end{pmatrix} = f \cdot \begin{pmatrix} \frac{\partial P}{\partial x} \\ \frac{\partial P}{\partial y} \end{pmatrix}\Bigg|_{x=x_1, y=y_1} \quad \text{[Expression 2]}$$

Therefore, a correspondence relationship between a point at which a certain light beam subjected to the refraction effect by the phase distribution P passes through the phase modulation surface Sm and a point at which the light beam passes through the intensity modulation surface Sp is given by the following [Expression 3].

[Math. 3]

$$\begin{pmatrix} ux(x, y) \\ uy(x, y) \end{pmatrix} - \begin{pmatrix} x \\ y \end{pmatrix} = f \cdot \begin{pmatrix} \frac{\partial P}{\partial x} \\ \frac{\partial P}{\partial y} \end{pmatrix}\Bigg|_{x,y} \quad \text{[Expression 3]}$$

The phase distribution to be given on the domain Dm will be referred to as "P'".

Figure 7:
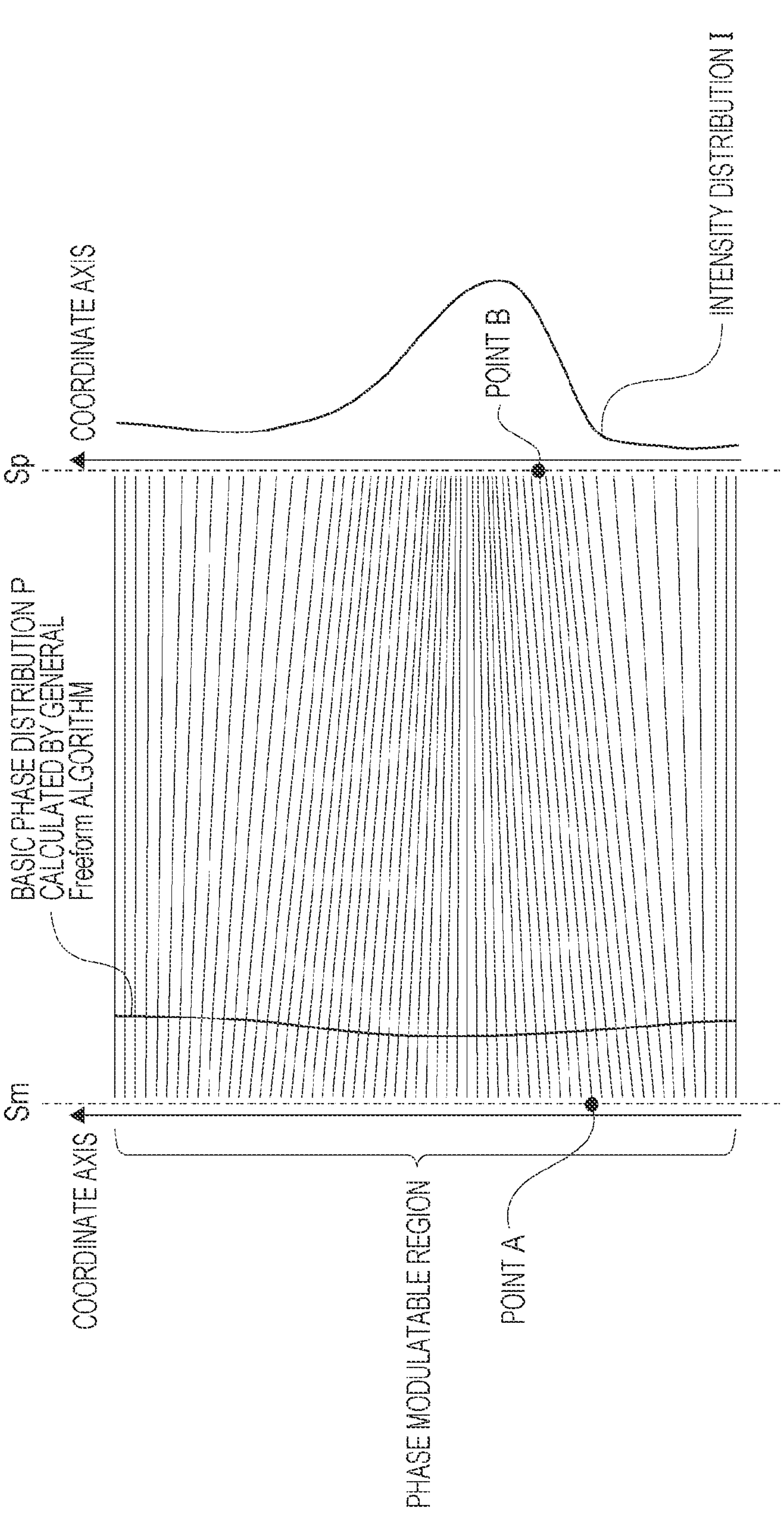
FIG. 7 is a diagram schematically illustrating a relationship between a phase distribution of the entire phase modulatable region and an intensity distribution achieved by the phase distribution in an irradiation region.
Figure 8:
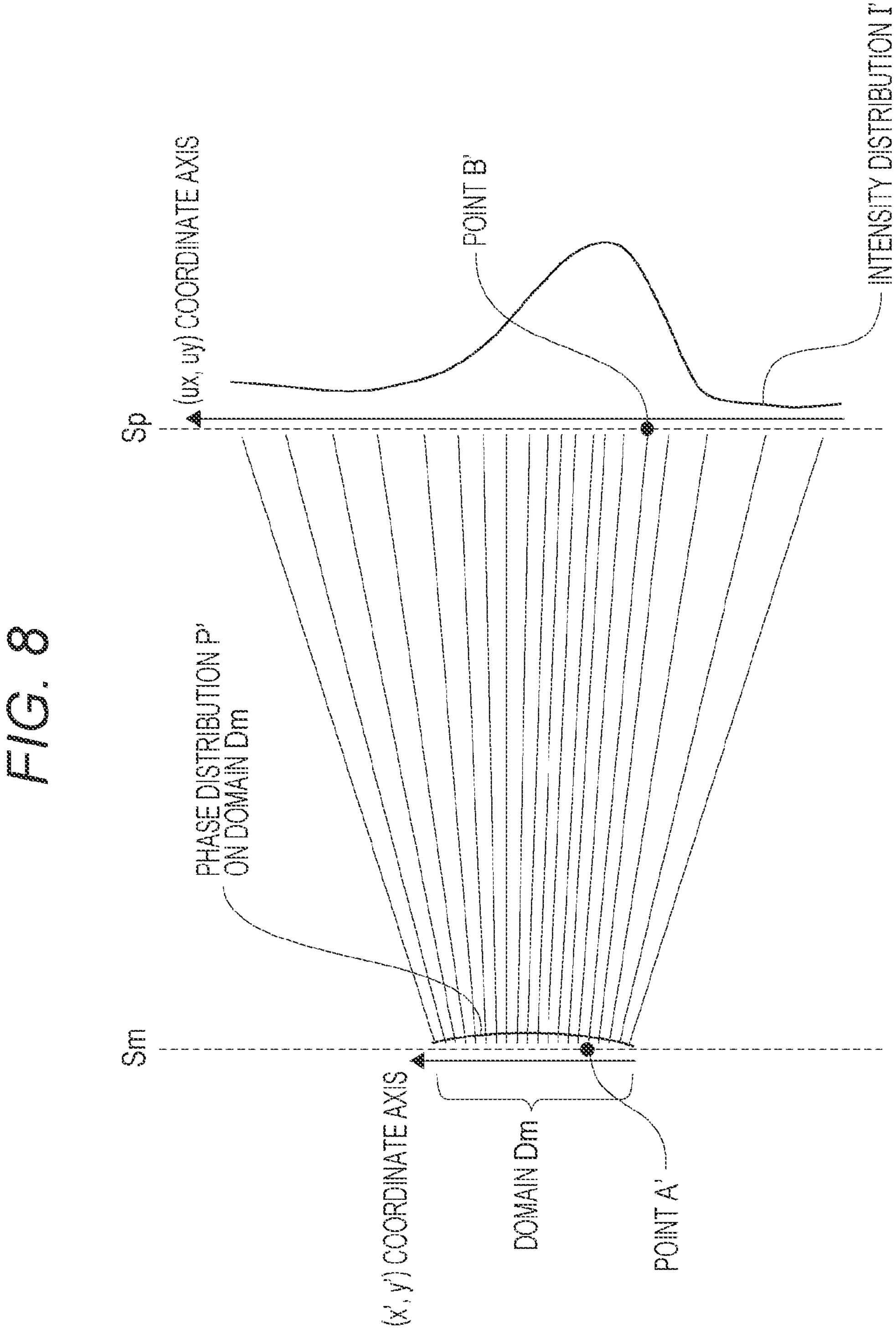
FIG. 8 is a diagram schematically illustrating a relationship between a phase distribution of a domain and an intensity distribution achieved by the phase distribution in the irradiation region.

As illustrated in FIGS. 7 and 8, the intensity distribution achieved in the irradiation region by refracting the light beam incident on the entire phase modulatable region by the phase distribution P is referred to as "I", and the intensity distribution achieved in the irradiation region by refracting the light beam incident on the domain Dm of the phase distribution P' is referred to as "I'". The condition that the phase distribution P' should satisfy is that the intensity distribution I and the intensity distribution I' match.

Here, as illustrated in FIG. 8, any point on the domain Dm is set as a point A', and its coordinates are set as (x', y')=($s_x$, $s_y$). Furthermore, a point where the light beam subjected to the refraction effect by the phase distribution P' at the point A' passes through the intensity modulation surface Sp is defined as a point B'.

Moreover, as illustrated in FIG. 7, a point on the phase modulatable region in the correspondence relationship of the coordinates (x, y)=($r \cdot s_x$, $r \cdot s_y$) with respect to the point A' is defined as a point A, and a point at which the light beam subjected to the refraction effect by the phase distribution P passes through the intensity modulation surface Sp at the point A is defined as a point B.

In order to match the intensity distribution I and the intensity distribution I', the phase distribution P' is only required to be determined so that the point B and the point B' match. Assuming that there is a phase distribution P' satisfying such a condition, as described in [Expression 2], the product of the gradient vector of the phase distribution P' at the point A' and the distance f coincides with the displacement in the in-plane direction between the point B and the point A', but the coordinates of the point B are calculated using the expression on the left side of [Expression 3] and

[Math. 4]

$$\begin{pmatrix} ux \\ uy \end{pmatrix} = \begin{pmatrix} ux(x, y) \\ uy(x, y) \end{pmatrix}\Big|_{x=r \cdot s_x, y=r \cdot s_y} \quad \text{[Expression 4]}$$

is obtained. When it is noted that the coordinates of the point A' in the (x, y) coordinate system are (x, y)=($s_x$+Δx, $s_y$+Δy), the following [Expression 5] is obtained as a conditional expression to be satisfied by the phase distribution P'.

[Math. 5]

$$f \cdot \begin{pmatrix} \frac{\partial P'}{\partial x'} \\ \frac{\partial P'}{\partial y'} \end{pmatrix}\Bigg|_{x'=s_x, y'=s_y} = \begin{pmatrix} ux(x, y) \\ uy(x, y) \end{pmatrix}\Big|_{x=t \cdot s_x, y=t \cdot s_y} - \begin{pmatrix} s_x + \Delta x \\ s_y + \Delta y \end{pmatrix} \quad \text{[Expression 5]}$$

When [Expression 3] is used, [Expression 5] is rewritten as the following [Expression 6].

[Math. 6]

$$\begin{pmatrix} \frac{\partial P'}{\partial x'} \\ \frac{\partial P'}{\partial y'} \end{pmatrix}\Bigg|_{x'=s_x, y'=s_y} = \begin{pmatrix} \frac{\partial P}{\partial x} \\ \frac{\partial P}{\partial y} \end{pmatrix}\Bigg|_{x=r \cdot s_x, y=t \cdot s_y} + \frac{1}{f} \cdot \begin{pmatrix} (r-1) \cdot s_x + \Delta x \\ (r-1) \cdot s_y + \Delta y \end{pmatrix} \quad \text{[Expression 6]}$$

Here, since the point A' is any point on the domain Dm, a conditional expression such as the following [Expression 7] obtained by rewriting ($s_x$, $s_y$) as (x', y') in [Expression 6] is obtained.

[Math. 7]

$$\begin{pmatrix} \frac{\partial P'}{\partial x'} \\ \frac{\partial P'}{\partial y'} \end{pmatrix}\Big|_{x',y'} = \begin{pmatrix} \frac{\partial P}{\partial x} \\ \frac{\partial P}{\partial y} \end{pmatrix}\Big|_{x=r\cdot x',y=r\cdot y'} + \frac{1}{f}\cdot\begin{pmatrix} (r-1)\cdot x' + \Delta x \\ (r-1)\cdot y' + \Delta y \end{pmatrix} \quad \text{[Expression 7]}$$

When a rotation field regarding (x', y') on the right side of [Expression 7] is calculated, the following [Expression 8] is obtained.

[Math. 8]

$$\begin{pmatrix} \frac{\partial}{\partial x'} \\ \frac{\partial}{\partial y'} \end{pmatrix} \times \left\{ \begin{pmatrix} \frac{\partial P}{\partial x} \\ \frac{\partial P}{\partial y} \end{pmatrix}\Big|_{x=r\cdot x',y=r\cdot y'} + \frac{1}{f}\cdot\begin{pmatrix} (r-1)\cdot x' + \Delta x \\ (r-1)\cdot y' + \Delta y \end{pmatrix} \right\} = r\cdot\begin{pmatrix} \frac{\partial}{\partial x} \\ \frac{\partial}{\partial y} \end{pmatrix} \times \begin{pmatrix} \frac{\partial P}{\partial x} \\ \frac{\partial P}{\partial y} \end{pmatrix}\Big|_{x=r\cdot x',y=r\cdot y'} \quad \text{[Expression 8]}$$

Here, since the phase distribution P is a known scalar field on (x, y) and the rotation field of the gradient field is zero for any (x, y), [Expression 8] eventually becomes zero. In general, since a necessary and sufficient condition for existence of a scalar field that gives a certain vector field as a gradient field is that the rotation field of the vector field becomes zero everywhere, the fact that the rotation field on the right side of the conditional expression of [Expression 7] becomes zero indicates that there is certainly a phase distribution P' that satisfies [Expression 7], that is, a phase distribution P' that gives the right side of [Expression 7] as a gradient field. Therefore, the value of the phase distribution P' at any point (x', y')=($s_x$, $s_y$) on the domain Dm can be configured as follows by performing line integration on the right side of Expression 7

[Math. 9]

$$P'|_{x'=s_x,y'=s_y} = \int_{t=0}^{t=s_x} \frac{\partial P'}{\partial x'}\Big|_{x'=t,y'=0} dt + \int_{t=0}^{t=s_y} \frac{\partial P'}{\partial y'}\Big|_{x'=s_x,y'=t} dt \quad \text{[Expression 9]}$$

$$= \frac{1}{r}\cdot P|_{x'=r\cdot s_x,y'=r\cdot s_y} + \frac{1}{2}\cdot\frac{r-1}{f}\cdot(s_x^2+s_y^2) - \frac{\Delta x\cdot s_x + \Delta y\cdot s_y}{f} \quad \text{[Expression 10]}$$

The first term in [Expression 10] above represents a component obtained by scaling the phase distribution P with the reduction magnification r in both the spatial direction and the phase direction, and the second and third terms represent lens components determined by the position of the domain Dm. Therefore, in order to calculate the phase distribution P' of each of the divided areas Ar, it is only necessary that scaling in the spatial direction and the phase direction is performed first on the phase distribution P obtained by the freeform method, a lens component corresponding to the position is added for each domain Dm with respect to the phase distribution after such scaling, and the phase distribution is allocated as the phase distribution P' of each domain Dm.

In this way, it is possible to reproduce each light intensity distribution in the same region on the intensity modulation surface Sp without shifting the position of the reproduced image from each domain Dm.

Hereinafter, the phase distribution P obtained for the entire phase modulatable region for the image of a certain color is referred to as a "basic phase distribution Dpr". Furthermore, a phase distribution obtained by performing scaling in the spatial direction and the phase direction according to the size of the domain Dm on the basic phase distribution Dpr is referred to as an "area basic phase distribution Dpa".

In a case where the first area Ar1 corresponds to an R image, the second area Ar2 corresponds to a G image, and the third area Ar3 corresponds to a blue image as in the first embodiment, the area basic phase distribution Dpa is obtained for each of the R image, the G image, and the B image.

The scaling with respect to the basic phase distribution Dpr is performed as scaling by a magnification "ard/arr", where the area of the entire phase modulatable region is "arr" and the area of the domain Dm is "ard".

Figure 9:
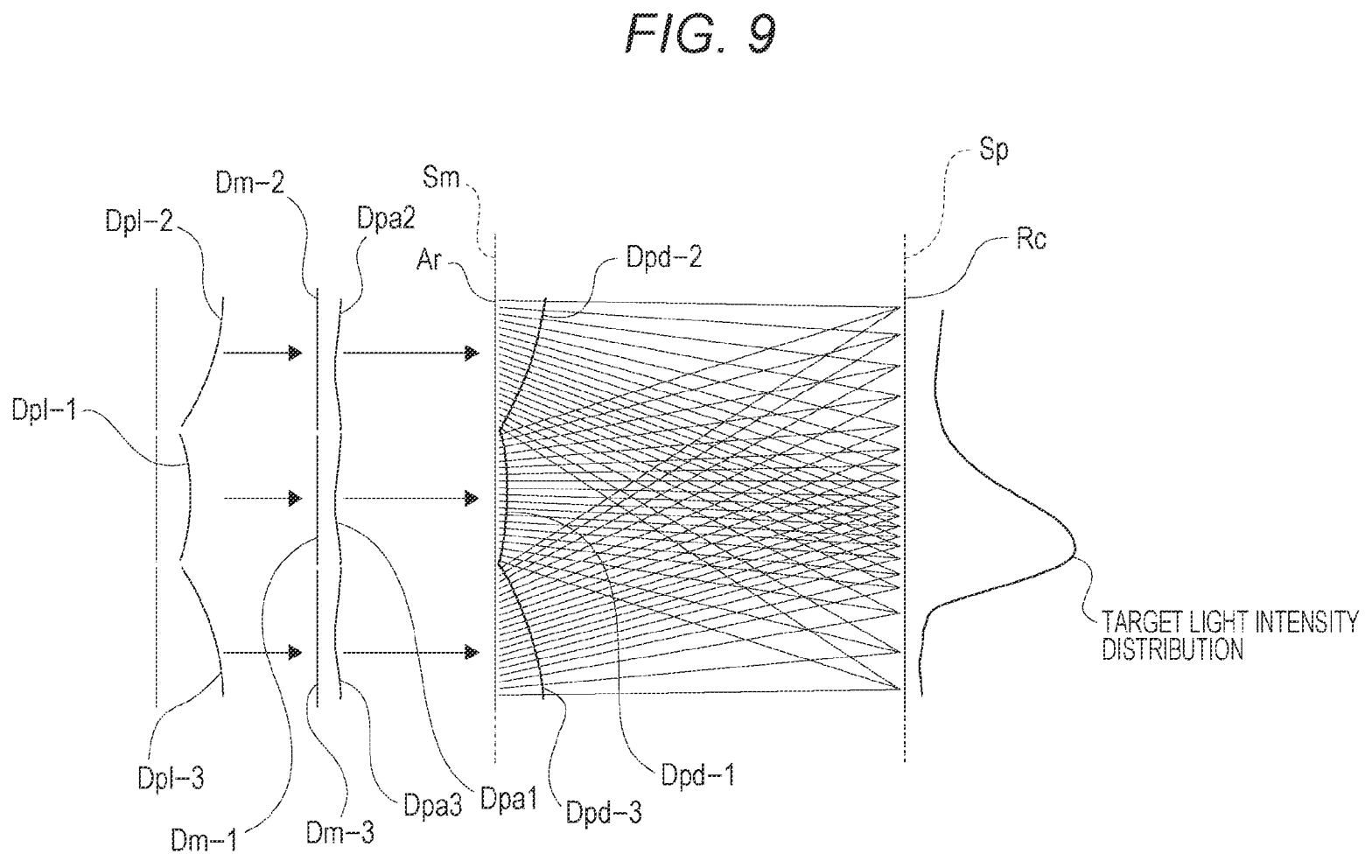

FIG. 9 is an explanatory diagram of addition of lens components.

Here, a domain Dm-1 located at the center as the domain Dm, and a domain Dm-2 and a domain Dm-3 located above and below the domain Dm-1, respectively, are illustrated. In the drawing, a phase distribution indicated as a lens component Dpl-1 is a phase distribution as a lens component corresponding to the position of the domain Dm-1, and lens components Dpl-2 and Dpl-3 are phase distributions as lens components corresponding to the positions of the domains Dm-2 and Dm-3, respectively. Furthermore, area basic phase distributions Dpa1, Dpa2, and Dpa3 mean area-basis phase distributions Dpa obtained corresponding to the domains Dm-1, Dm-2, and Dm-3, respectively.

As illustrated, the phase distribution Dpd-1 to be set for the domain Dm-1 is obtained as a phase distribution obtained by adding the lens component Dpl-1 to the area basic phase distribution Dpa1. Similarly, the phase distribution Dpd-2 to be set for the domain Dm-2 is obtained as a phase distribution obtained by adding the lens component Dpl-2 to the area basic phase distribution Dpa2, and the phase distribution Dpd-3 to be set for the domain Dm-3 is obtained as a phase distribution obtained by adding the lens component Dpl-3 to the area basic phase distribution Dpa2.

Thus, respective domains Dm of the domains Dm-1, Dm-2, and Dm-3 can reproduce respective target light intensity distributions in the same region on the intensity modulation surface Sp.

Hereinafter, a phase distribution obtained by adding the lens component Dpl corresponding to each domain Dm to the area basic phase distribution Dpa as described above is collectively referred to as an "area phase distribution Dpd".

Here, in the first embodiment, it is assumed that three subframes of R, G, and B are output within one frame period as described above. Therefore, the phase pattern calculation unit 11 illustrated in FIG. 1 calculates, for each of images of R, G, and B obtained for each frame, "area phase distribution DpdR" that is the area phase distribution Dpd corresponding to the R image, "area phase distribution DpdG" that is the area phase distribution Dpd corresponding to the G image, and "area phase distribution DpdB" that is the area phase distribution Dpd corresponding to the B image.

(1-4. Specific Control Method)

A specific example of a control method as the first embodiment will be described with reference to FIGS. 10 and 11.

Note that, in the following description, in expressing the difference in color of light on the drawings, each color is represented by a line type as follows.

Red (R): solid line

Green (G): short dashed line

Blue (B): one-dot chain line

Yellow (Y): two-dot chain line

Cyan (C): long dashed line

Figure 10:
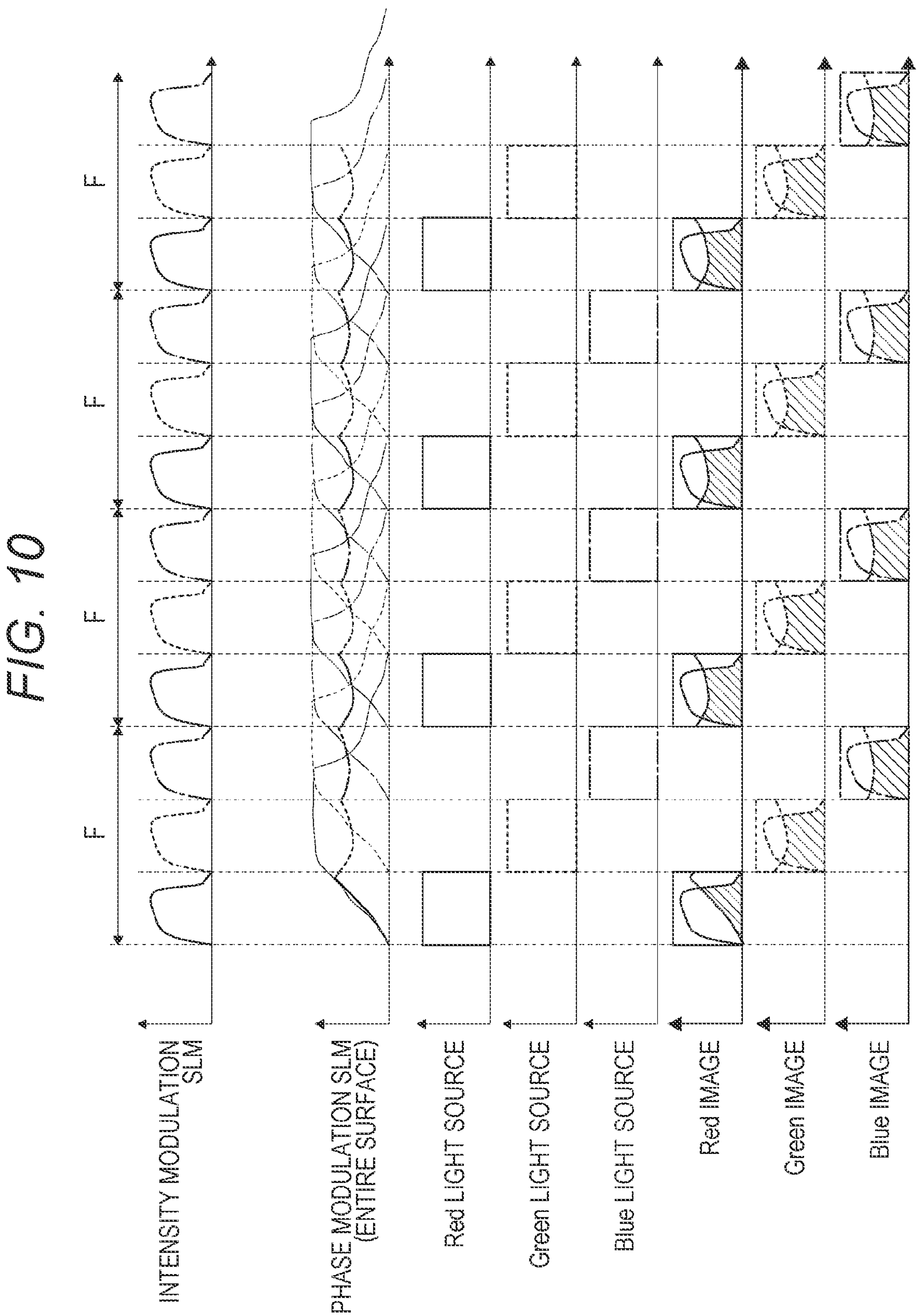
FIG. 10 is an explanatory diagram of an operation in a case where a conventional configuration is employed with respect to the illumination device of the first embodiment.
Figure 11:
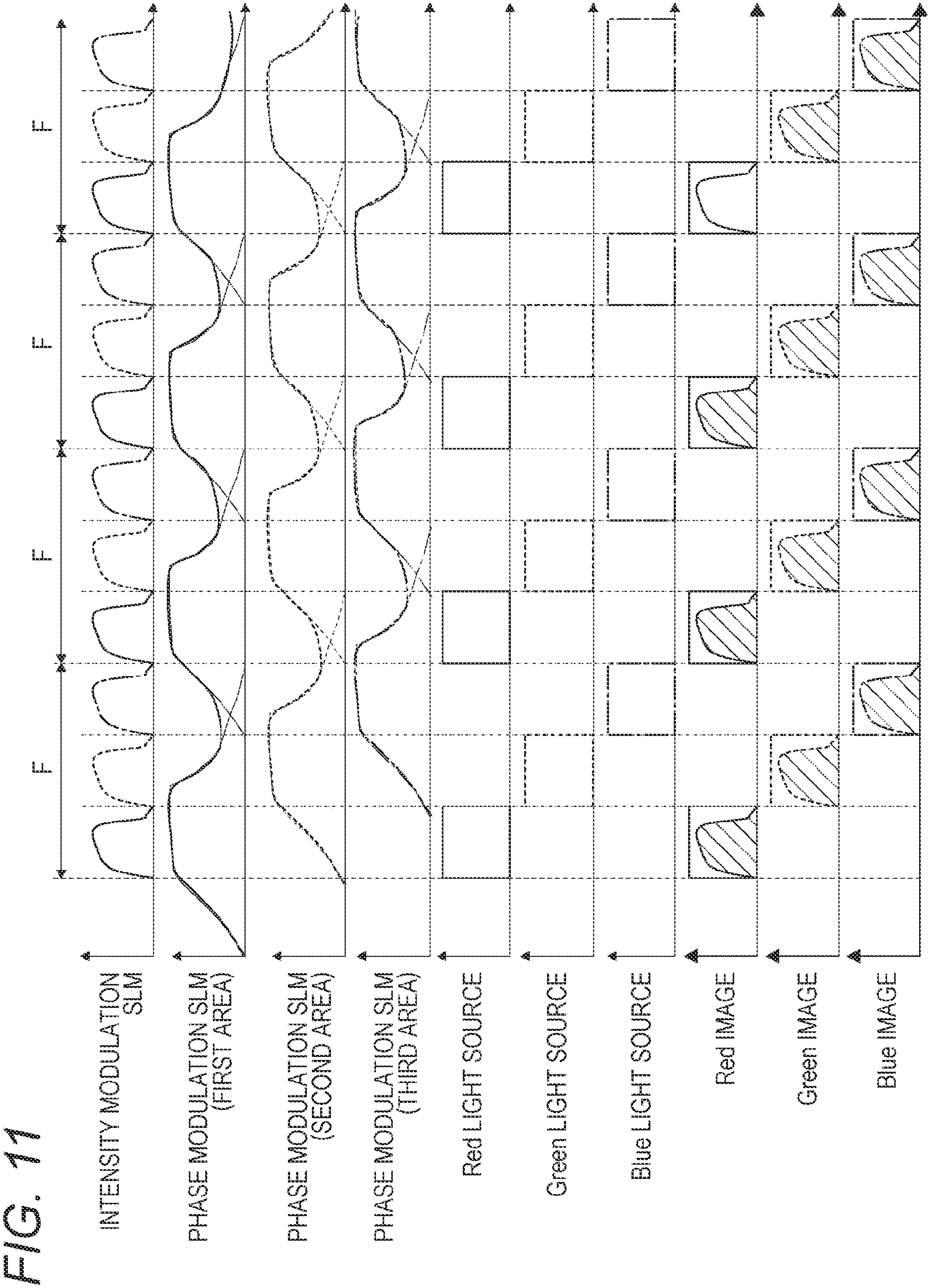
FIG. 11 is an explanatory diagram of a control method as the first embodiment.

As illustrated as "intensity modulation SLM" in FIGS. 10 and 11, in the present embodiment, subframes of three colors of R, G, and B are output for each frame period F, for example.

FIG. 10 illustrates a response characteristic ("phase modulation SLM" in the drawing) in the phase modulation SLM 3 in a case where the intensity modulation surface Sp is irradiated with a corresponding reproduced image for each subframe without area division of the phase modulation surface Sm, and ON/OFF timings of the light emitting units 2*r*, 2*g*, and 2*b* ("red light source", "green light source", and "blue light source" in the drawing), and the degree of contribution of the illumination light by the phase modulation SLM 3 to the projected image of each subframe ("red image", "green image", and "blue image" in the drawing).

As for driving of the light emitting units 2*r*, 2*g*, and 2*b*, as illustrated in the drawing, only the light emitting unit 2*r* is caused to emit light in the subframe period of R, only the light emitting unit 2*g* is caused to emit light in the subframe period of G, and only the light emitting unit 2*b* is caused to emit light in the subframe period of B within the frame period F.

As can be seen with reference to FIG. 10, in a case where the phase modulation surface Sm is not divided into areas, the liquid crystal response for the phase modulation for the corresponding color is not in time in each of the subframe periods of R, G, and B, and crosstalk in the time direction occurs between the subframe images of the respective colors. This crosstalk causes a decrease in the sense of resolution and a decrease in contrast of the projected image.

FIG. 11 is an explanatory diagram of a control method as the first embodiment involving area division of the phase modulation surface Sm.

As described above, in the present example, the light from the light emitting unit 2*r* is incident on the first area Ar1, the light from the light emitting unit 2*g* is incident on the second area Ar2, and the light from the light emitting unit 2*b* is incident on the third area Ar3.

By performing the area division, it is sufficient if the first area Ar1 is assigned to only the subframe period of R, the second area Ar2 is assigned to only the subframe period of G, and the third area Ar3 is assigned to only the subframe period of B, and it is possible to generate a margin time (response margin time) that can be allocated as a time for a response within the frame period F in each area Ar.

Therefore, in the present example, the modulation driving is started at the timing before the light incident period for each area Ar. Specifically, for the first area Ar1, phase modulation driving for reproduced image generation corresponding to the R image is started at a timing before the light incident period (that is, the subframe period of R) from the light emitting unit 2*r*. That is, the phase modulation driving based on the area phase distribution DpdR described above is started.

Similarly, for the second area Ar2, the phase modulation driving based on the area phase distribution DpdG described above is started at a timing before the light incident period (subframe period of G) from the light emitting unit 2*g*, and for the third area Ar3, the phase modulation driving based on the area phase distribution DpdB described above is started at a timing before the light incident period (subframe period of B) from the light emitting unit 2*b*.

Thus, in each subframe period, the response in the corresponding area Ar is in time, and the crosstalk between the subframe images can be reduced.

In order to implement the operation as the first embodiment as described above, the control unit 8 illustrated in FIG. 1 performs control as follows in each frame period F.

That is, as control of the light source unit 2, control is performed so that only the light emitting unit 2*r* is turned on during the subframe period of R, only the light emitting unit 2*g* is turned on during the subframe period of G, and only the light emitting unit 2*b* is turned on during the subframe period of B.

Furthermore, in each frame period F, area phase distributions DpdR, DpdG, and DpdB are calculated on the basis of the input image data.

Moreover, as drive control of the phase modulation SLM 3, as described above, the phase modulation driving based on the corresponding area phase distribution Dpd is started at the timing before the light incident period from the corresponding light emitting unit for each of the areas Ar1, Ar2, and Ar3.

Here, it is also possible to gain a response time by providing a plurality of phase modulation SLMs 3, but in this case, it is necessary to bend the light flux relatively largely by the phase modulation pattern in order to irradiate the same region on the intensity modulation surface Sp with the reproduced image of each phase modulation SLM 3. As the number of the phase modulation SLMs 3 is increased, the bending amount of the light flux is increased, and the feasibility is deteriorated. Although it is conceivable to coaxially multiplex the plurality of phase modulation SLMs 3 using a dichroic mirror, a polarization beam splitter (PBS), or the like, the system size increases.

Furthermore, in a case where a plurality of phase modulation SLMs 3 is used, the light illuminated on each phase modulation SLM 3 is vignetted by the aperture, which leads to a decrease in light utilization efficiency.

According to the method of the embodiment in which the single-chip phase modulation SLM 3 is divided and used, it is possible to solve these problems.

2. Second Embodiment

Next, a second embodiment will be described.

Figure 12:
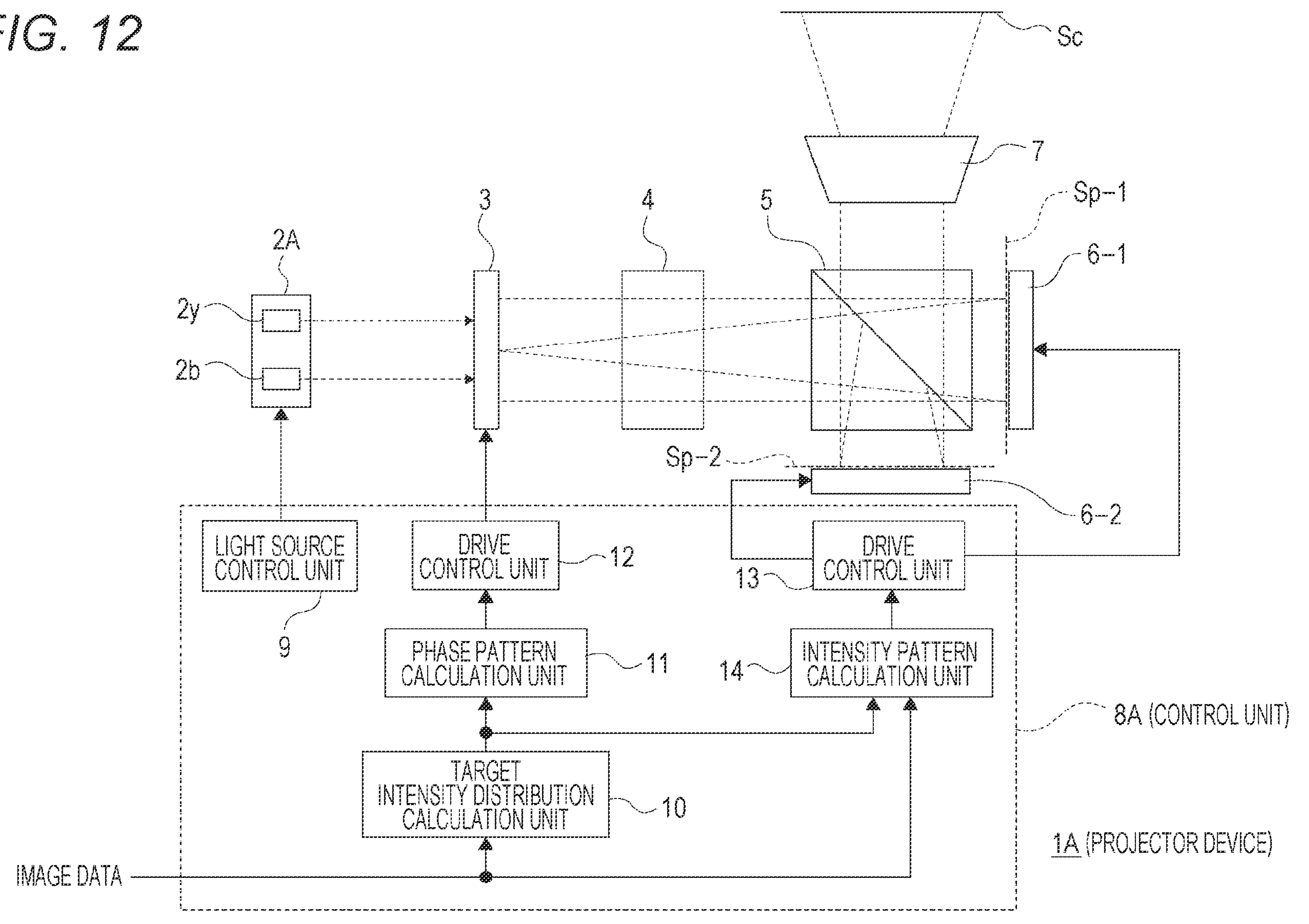
FIG. 12 is a diagram illustrating a configuration example of an illumination device as a second embodiment.

FIG. 12 is a diagram illustrating a configuration example of a projector device 1A as a second embodiment.

Note that, in the following description, the same reference numerals are given to parts similar to those already described, and description thereof will be omitted.

The projector device 1A of the second embodiment is different from the projector device 1 of the first embodiment in that a light source unit 2A is provided instead of the light source unit 2, two intensity modulation SLMs 6-1 and 6-2 are provided as the intensity modulation SLM 6, and a control unit 8A is provided instead of the control unit 8.

In this case, the optical system including the prism 5, the intensity modulation SLM 6-1, the intensity modulation SLM 6-2, and the projection lens 7 is configured such that, for the intensity modulation SLMs 6-1 and 6-2 arranged at different positions, an intensity modulation surface Sp-1 of the intensity modulation SLM 6-1 and an intensity modulation surface Sp-2 of the intensity modulation SLM 6-2 are irradiated with the reproduced image from the phase modulation SLM 3, and an intensity modulation image from each of the intensity modulation surfaces Sp-1 and Sp-2 is incident on the projection lens 7 via the prism 5.

In this case, the intensity-modulated images from the respective intensity modulation surfaces Sp-1 and Sp-2 are projected onto the same region on the projection target surface (surface on which image projection is performed by the projection lens 7).

Here, the second embodiment is an example in which one frame period includes two subframe periods. That is, each of the intensity modulation SLMs 6-1 and 6-2 performs spatial light intensity modulation for two subframe images within one frame period.

Specifically, in the present example, the intensity modulation SLM 6-1 performs the spatial light intensity modulation of the subframe image of R in the first subframe period in the frame period F, and performs the spatial light intensity modulation of the subframe image of B in the second subframe period.

Furthermore, in the intensity modulation SLM 6-2, the spatial light intensity modulation of the subframe image of G is performed in the above first subframe period, and the spatial light intensity modulation of the subframe image of B is performed in the above second subframe period.

Then, corresponding to this, the light source unit 2A is provided with a light emitting unit 2*y* that emits Y (yellow) light that is a composite color of R and G, and a light emitting unit 2*b* that emits B light.

Furthermore, for the phase modulation SLM 3, the phase modulation surface Sm is divided into two. The areas Ar divided at this time are referred to as a first area Ar1 and a second area Ar2.

A control method as the second embodiment will be described with reference to FIGS. 13 and 14.

FIGS. 13 and 14 are diagrams illustrating items similar to those in FIGS. 10 and 11 described above, FIG. 13 is a diagram of a case where area division of the phase modulation SLM 3 is not performed on the premise of the configuration of the projector device 1A as the second embodiment described above, and FIG. 14 is a diagram of a case where the control method as the second embodiment is employed.

Figure 13:
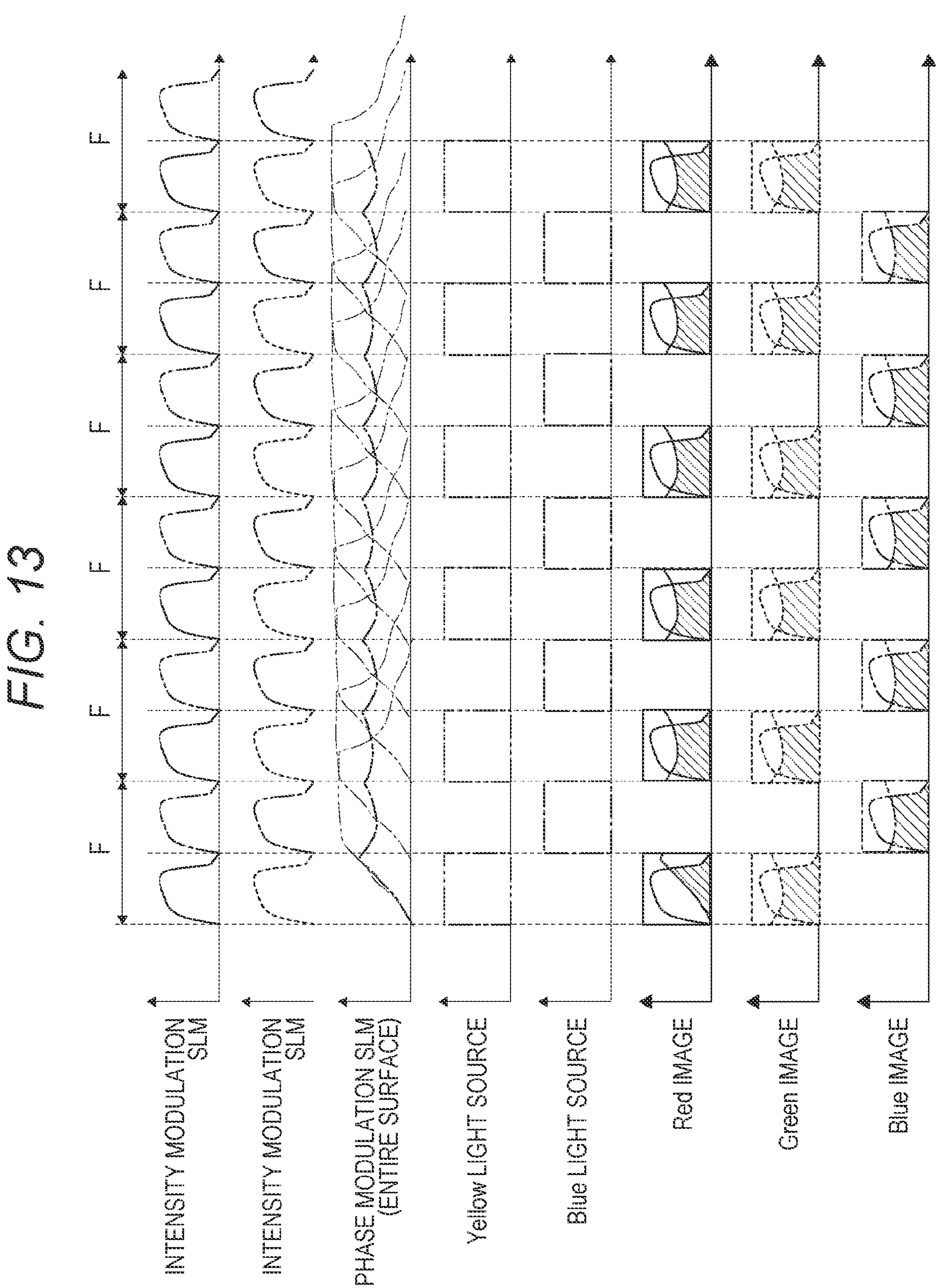
FIG. 13 is an explanatory diagram of an operation in a case where the conventional configuration is employed with respect to the illumination device of the second embodiment.
Figure 14:
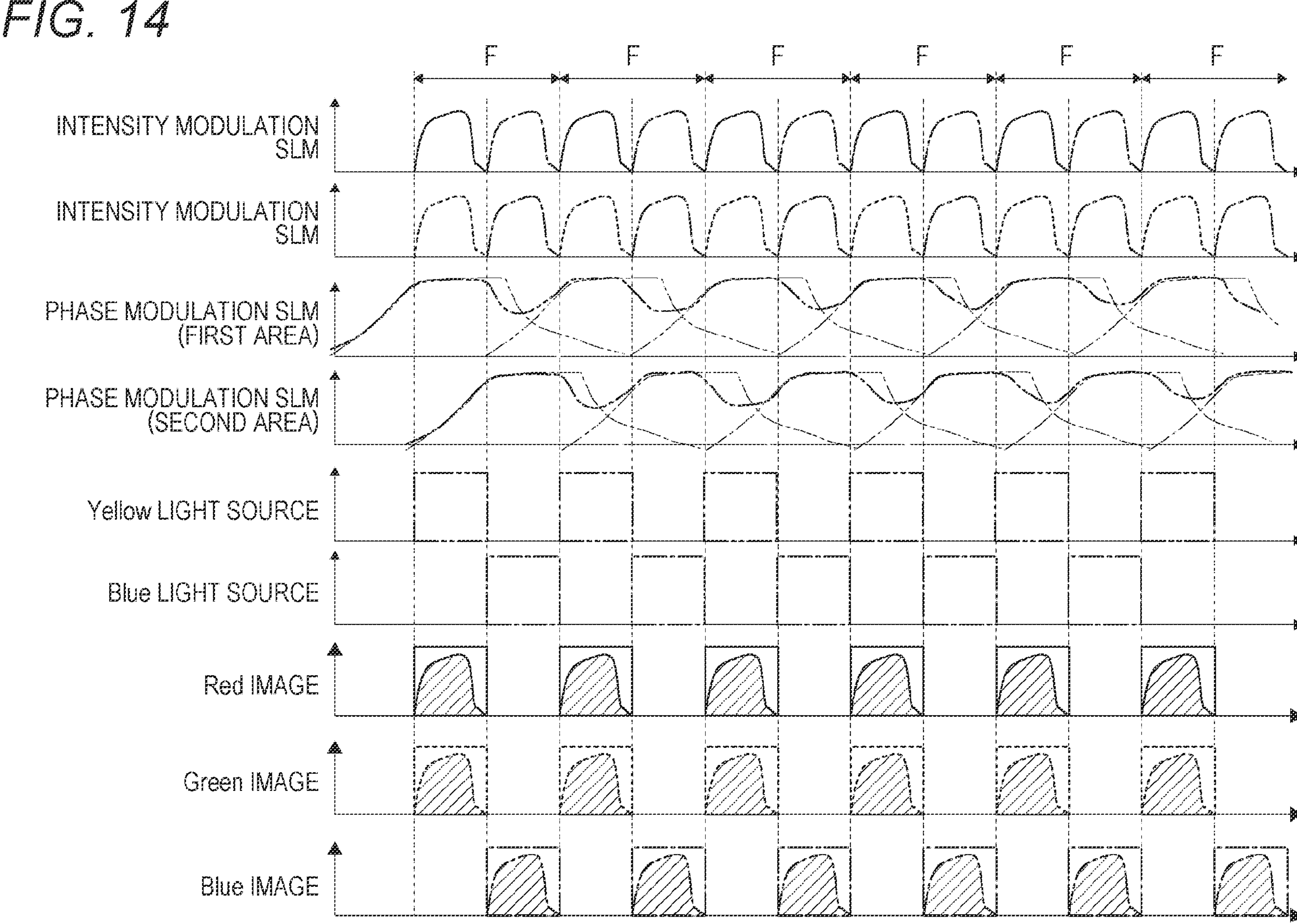
FIG. 14 is an explanatory diagram of a control method as the second embodiment.

As illustrated in FIGS. 13 and 14, in this case, in a first subframe period in which the intensity modulation SLM 6-1 modulates the subframe image of R and the intensity modulation SLM 6-2 modulates the subframe image of G, only the light emitting unit 2*y* is caused to emit light in the light source unit 2A, and in a second subframe period in which the intensity modulation SLM 6-1 modulates the subframe image of B and the intensity modulation SLM 6-2 also modulates the subframe image of B, only the light emitting unit 2*b* is caused to emit light in the light source unit 2A.

As can be seen with reference to FIG. 13, also in this case, unless the phase modulation surface Sm is divided into areas, the liquid crystal response cannot be in time in each subframe period, and this contributes to the crosstalk between subframe images in the time direction.

In the second embodiment, after the phase modulation surface Sm is divided into two to form the first area Ar1 and the second area Ar2 as described above, light from the light emitting unit 2*y* is incident on the first area Ar1, and light from the light emitting unit 2*b* is incident on the second area Ar2.

By performing the area division, as illustrated in FIG. 14, the first area Ar1 only needs to be assigned to the first subframe period in which the spatial light intensity modulation of the subframe images of R and G is performed, and the second area Ar2 only needs to be assigned to the second subframe period in which the spatial light intensity modulation of the subframe image of B is performed in both the intensity modulation SLMs 6-1 and 6-2. That is, also in this case, a response margin time occurs in each area Ar within the frame period F.

Therefore, in the second embodiment, for the first area Ar1, the phase modulation driving for reproduced image generation corresponding to a Y image is started at a timing before the light incident period (first subframe period) from the light emitting unit 2*y*. Similarly, for the second area Ar2, the phase modulation driving for reproduced image generation corresponding to the B image is started at a timing before the light incident period (second subframe period) from the light emitting unit 2*b*.

Thus, in each subframe period, the response in the corresponding area Ar is in time, and the crosstalk between the subframe images can be reduced.

Furthermore, in the second embodiment, in the first subframe period in which the spatial light intensity modulation of the subframe images of R and G is performed, the light source of the Y light that is a composite color of R and G is caused to emit light, and reproduced image generation corresponding to the Y image is performed in the first area Ar1, so that it is possible to suppress a decrease in the sense of resolution of the subframe images of R and G.

In order to implement the operation as the second embodiment as described above, the control unit 8A illustrated in FIG. 12 performs control as follows in each frame period F.

That is, as control of the light source unit 2A, control is performed so that only the light emitting unit 2*y* is turned on during the first subframe period, and only the light emitting unit 2*b* is turned on during the second subframe period.

Furthermore, in each frame period F, an area phase distribution DpdY that is an area phase distribution Dpd corresponding to the Y image and an area phase distribution DpdB corresponding to the B image are calculated on the basis of the input image data.

Moreover, as drive control of the phase modulation SLM 3, the phase modulation driving based on the corresponding area phase distribution Dpd is started at a timing before the light incident period from the corresponding light emitting unit for each of the first area Ar1 and the second area Ar2.

Note that, in the above example, in the frame period F, the first subframe period (the modulation period of the subframe images of R and G) precedes the second subframe period (the modulation period of the subframe image of B), but conversely, the second subframe period may precede the first subframe period.

Furthermore, in the second embodiment, it is also conceivable to use W (white) which is a composite color of R, G, and B as the composite color.

Figure 15:
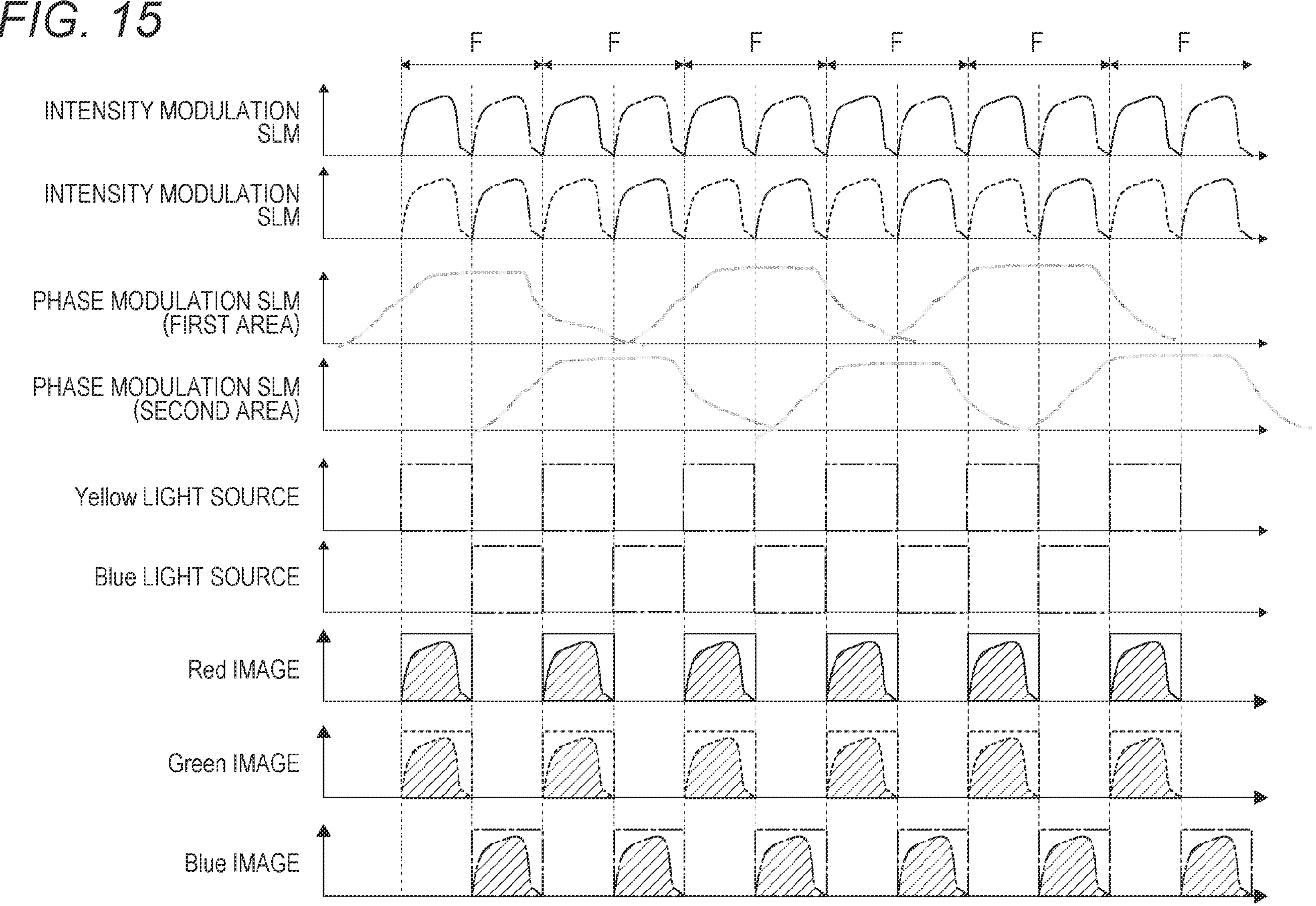
FIG. 15 is an explanatory diagram of the control method in a case where phase modulation corresponding to white is performed in the second embodiment.

Specifically, as illustrated in FIG. 15, each of the first area Ar1 and the second area Ar2 is driven with a phase modulation pattern corresponding to a W image (in the drawing, W is represented by a gray line). W can correspond to both R and G in the first subframe period and B in the second subframe period. Therefore, as illustrated in the drawing, phase modulation corresponding to the W image is alternately performed every other frame in each of the first area Ar1 and the second area Ar2. Specifically, in the first area Ar1, for example, phase modulation corresponding to the W image is performed over one frame period (that is, over the first and second subframe periods) in an even frame, and in the second area Ar2, for example, phase modulation corresponding to the W image is performed over one frame period in an odd frame.

Thus, in each area Ar of the first area Ar1 and the second area Ar2, the response margin time can be further enlarged, and the crosstalk reduction effect in the time direction of the projected image can be improved.

In a case where the phase modulation pattern corresponding to the W image as described above is used, the control unit 8A is only required to perform control as follows.

That is, as control of the light source unit 2A, in each frame period F, control is performed so that only the light emitting unit 2*y* is turned on in the first subframe period, and only the light emitting unit 2*b* is turned on in the second subframe period.

Furthermore, in each frame period F, the area phase distribution DpdW that is the area phase distribution Dpd corresponding to the W image is calculated on the basis of the input image data.

Moreover, as drive control of the phase modulation SLM 3, for the first area Ar1, the phase modulation driving based on the area phase distribution DpdW is started at a timing before the target even-numbered frame period, and the phase modulation driving state based on the area phase distribution DpdW is continued over one frame period, and for the second area Ar2, the phase modulation driving based on the area phase distribution DpdW is started at a timing before the target odd-numbered frame period, and the phase modulation driving state based on the area phase distribution DpdW is continued over one frame period.

Note that, although all the areas Ar are driven with the phase modulation pattern corresponding to the W image in the above example, a configuration can be employed in which only one area Ar is driven with the phase modulation pattern corresponding to the W image.

3. Third Embodiment

Figure 16:
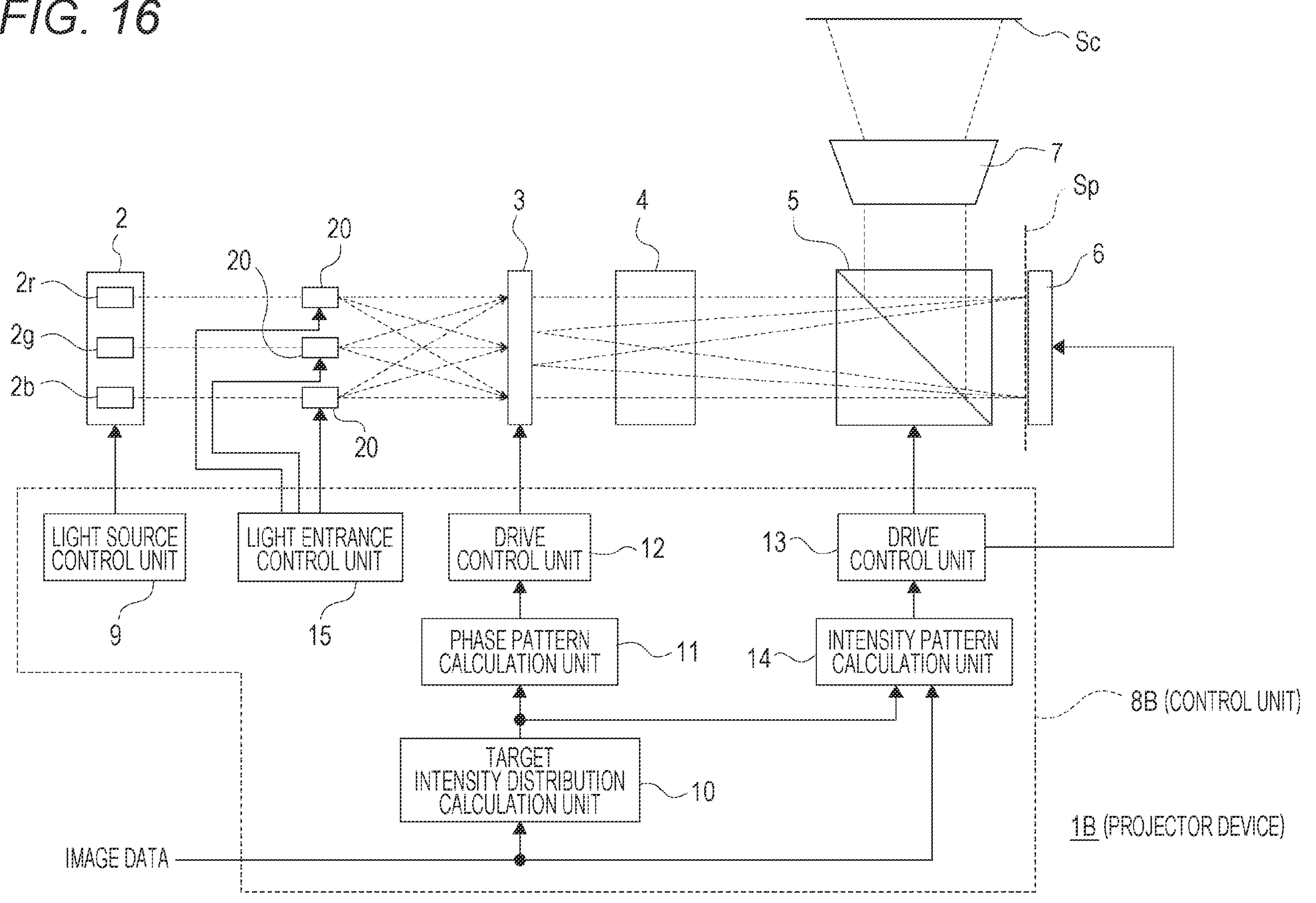
FIG. 16 is a diagram illustrating a configuration example of an illumination device as a third embodiment.

FIG. 16 is a diagram illustrating a configuration example of a projector device 1B as a third embodiment.

The projector device 1B is different from the projector device 1 of the first embodiment in that light shift units 20 for R light, G light, and B light are provided between the light source unit 2 and the phase modulation SLM 3, and a control unit 8B is provided instead of the control unit 8.

The control unit 8B is different from the control unit 8 in that a light entrance control unit 15 for controlling the operation of each light shift unit 20 is provided.

The light shift unit 20 is provided to switch an area Ar on which light is incident for each corresponding light emitting unit.

Figure 17A:
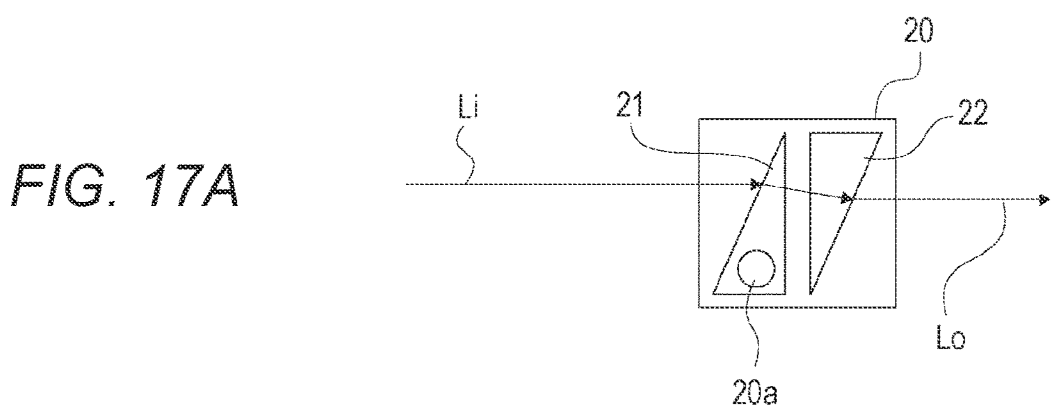
FIG. 17A is an explanatory diagram of a light shift unit according to the embodiment.
Figure 17B:
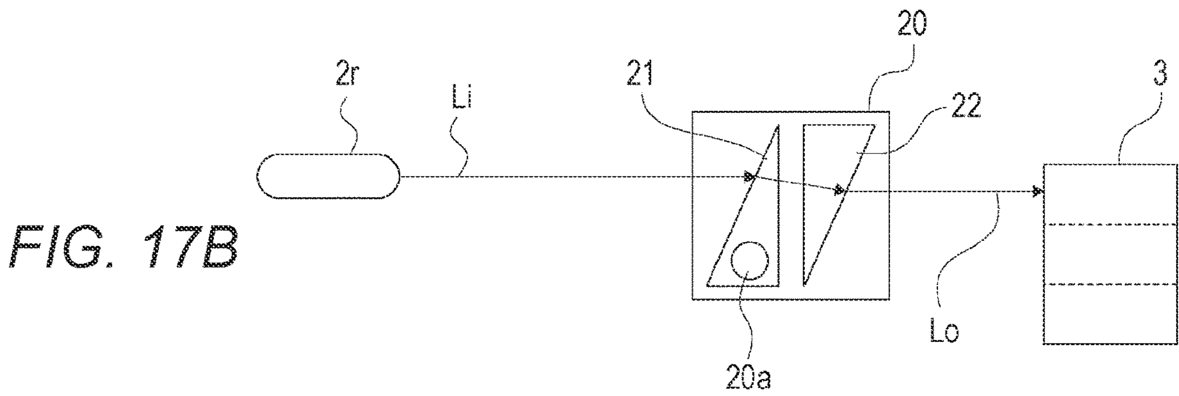
FIG. 17B is an explanatory diagram of a light shift unit according to the embodiment.
Figure 17C:
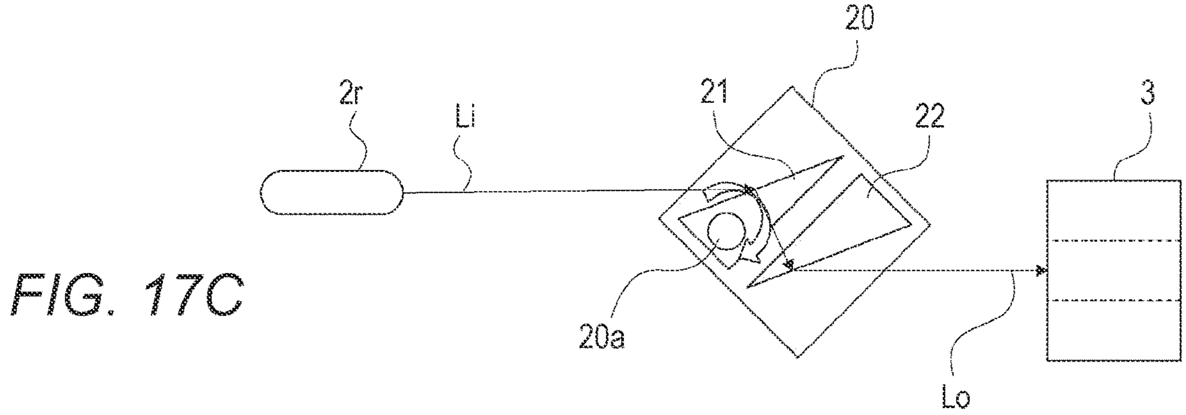
FIG. 17C is an explanatory diagram of a light shift unit according to the embodiment.

FIGS. 17A-17C are explanatory diagrams of the light shift unit 20.

As illustrated in FIG. 17A, the light shift unit 20 is configured to be able to translate an optical axis of incident light Li from the light source unit 2 side and output the incident light Li as emission light Lo to the phase modulation SLM 3 side. Specifically, as illustrated, the light shift unit 20 is configured by combining wedge-type optical elements 21 and 22, and is rotatable about a turning shaft 20*a* (a shaft parallel to an optical axis orthogonal plane of the incident light Li) provided in the wedge-type optical element 21, for example.

FIGS. 17B and 17C illustrate an optical axis shift operation by the light shift unit 20.

Here, the operation of the light shift unit 20 provided with respect to the light emitting unit 2*r* that emits R light is illustrated as a representative example, but as illustrated in the drawing, the wedge-type optical elements 21 and 22 turn about the turning shaft 20*a*, so that it is possible to switch which area Ar of the phase modulation SLM 3 the emission light Lo of the R light is made incident on. In other words, it is possible to select the area Ar on which the light from the light source unit 2 side is made incident.

Although not illustrated, with respect to the G light and the B light, it is possible to similarly switch which area Ar the light from the light emitting units 2*g* and 2*b* side is made incident on by the light shift unit 20 provided correspondingly.

Note that the specific configuration of the light shift unit 20 is not limited to that described in FIGS. 17A-17C, and is not limited to a specific configuration as long as the optical axis of the incident light Li is shifted (translated).

The third embodiment is an example in which one frame period includes four subframe periods. Specifically, the intensity modulation SLM 6 in this case performs spatial light intensity modulation on four subframe images of R, G, B, and G within one frame period. Here, it is assumed that the first subframe period is the head of the frame period F, followed by the second, third, and fourth subframe periods. Then, the intensity modulation SLM 6 in this case is an example in which spatial light intensity modulation of the subframe image in each frame period F is performed with allocation of the first subframe period=R, the second subframe period=G, the third subframe period=B, and the fourth subframe period=G.

A control method as the third embodiment will be described with reference to FIGS. 18 and 19.

Figure 18:
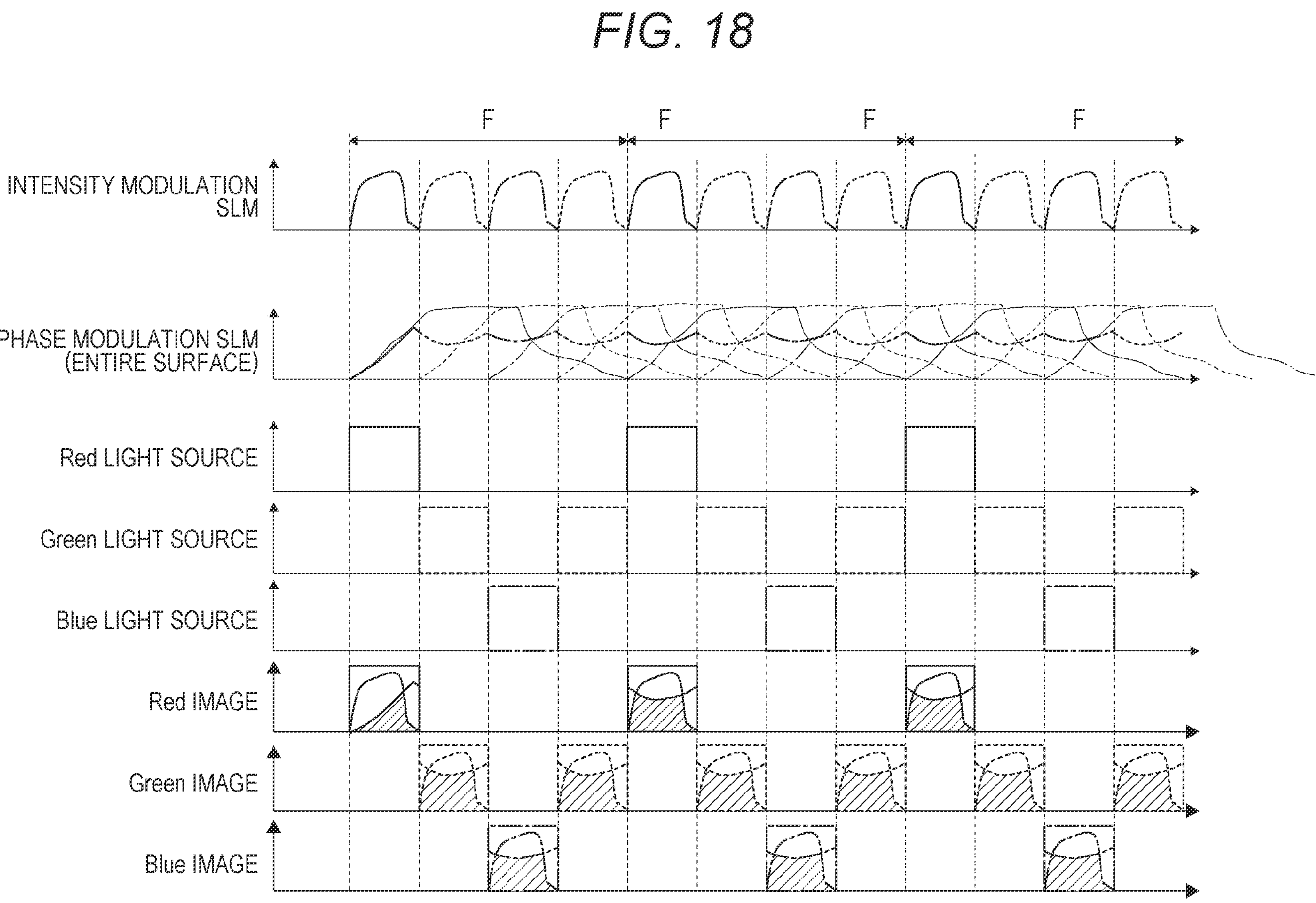
FIG. 18 is an explanatory diagram of an operation in a case where a conventional configuration is employed for the illumination device of the third embodiment.

FIG. 18 is an explanatory diagram in a case where area division of the phase modulation SLM 3 is not performed on the premise of the configuration of the projector device 1B as the third embodiment described above, and FIG. 19 is an explanatory diagram in a case where the control method as the third embodiment is employed.

Figure 19:
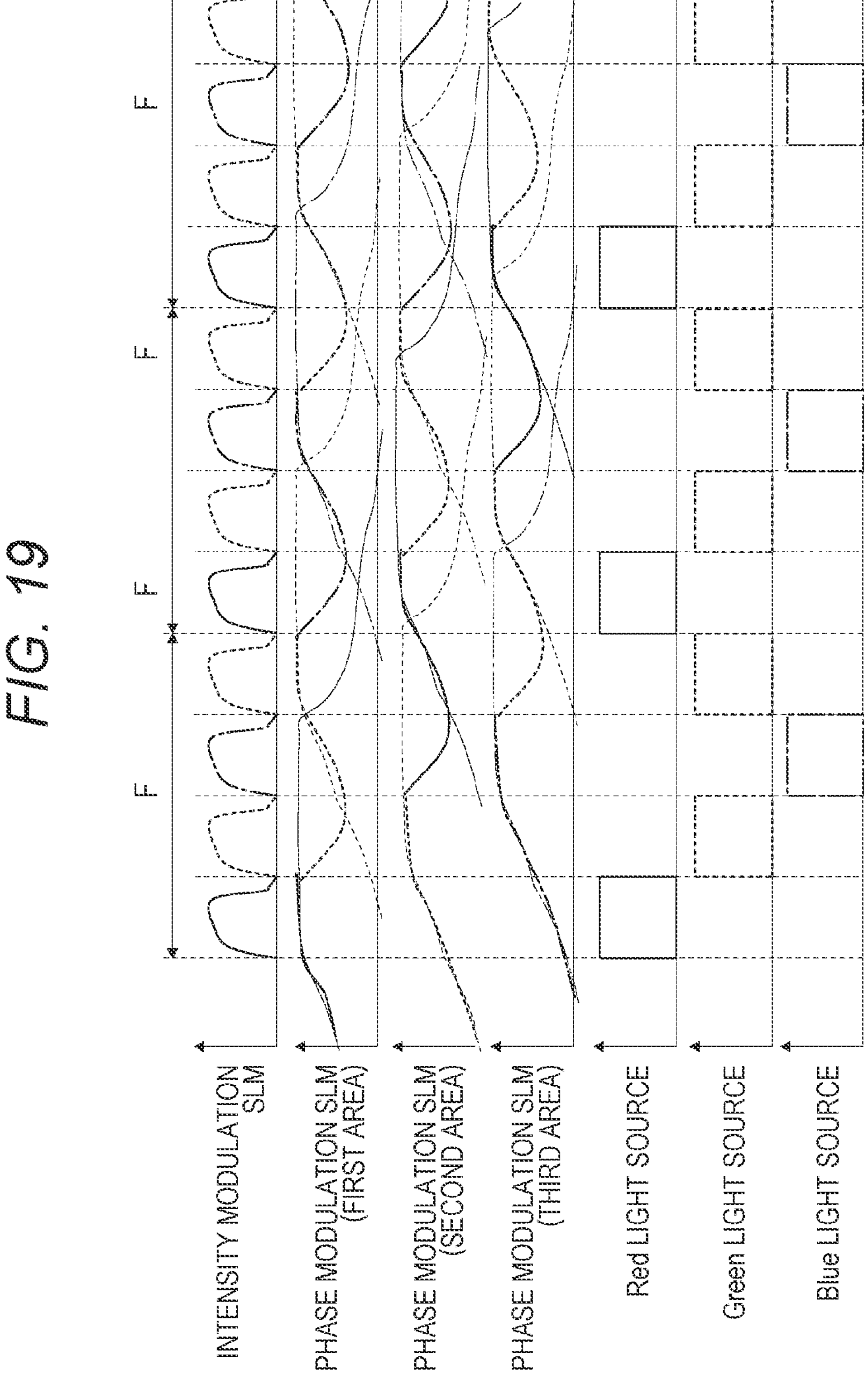
FIG. 19 is an explanatory diagram of a control method as the third embodiment.

As illustrated in FIGS. 18 and 19, as control of the light source unit 2 in this case, only the light emitting unit 2*r* is turned on in the first subframe period (R), only the light emitting unit 2*g* is turned on in the second subframe period (G), only the light emitting unit 2*b* is turned on in the third subframe period (B), and only the light emitting unit 2*g* is turned on in the fourth subframe period (G).

As can be seen with reference to FIG. 18, also in this case, unless the phase modulation surface Sm is divided into areas, the liquid crystal response cannot be in time in each subframe period, and this contributes to the crosstalk between subframe images in the time direction.

In the third embodiment, as in a case of the first embodiment, the phase modulation surface Sm is divided into three to form the first area Ar1, the second area Ar2, and the third area Ar3, and then, as illustrated in FIG. 19, the assigned color of each area Ar is changed in the repeating order of R, G, B, and G every two subframes.

Specifically, for the first area Ar1, in the first frame period F, the phase modulation of the R image is assigned to the first subframe period, and after the first subframe period, the target color of the phase modulation is cyclically changed as G→B→G→R→ . . . every two subframes.

For the second area Ar2, in the first frame period F, the phase modulation of the G image is assigned to the second subframe period, and after the second subframe period, the target color of the phase modulation is cyclically changed as R→G→B→G→ . . . every two subframes.

For the third area Ar3, in the first frame period F, the phase modulation of the B image is assigned to the third subframe period, and after the third subframe period, the target color of the phase modulation is cyclically changed as G→R→G→B→ . . . every two subframes.

At this time, the light from the light source unit 2 is made incident on each area Ar by the light shift unit 20 in the repeating order of R, G, B, and G every two subframes.

Specifically, for the first area Ar1, in the first frame period F, the R light from the light emitting unit 2*r* is made incident in the first subframe period, and after the first subframe period, the color of the incident light is cyclically changed as G→B→G→R→ . . . every two subframes.

For the second area Ar2, in the first frame period F, the G light from the light emitting unit 2*g* is made incident in the second subframe period, and after the second subframe period, the color of the incident light is cyclically changed as R→G→B→G→ . . . every two subframes.

For the third area Ar3, in the first frame period F, the B light from the light emitting unit 2*b* is made incident in the third subframe period, and after the third subframe period, the color of the incident light is cyclically changed as G→R→G→B→ . . . every two subframes.

According to the control method as the third embodiment as described above, time corresponding to two subframe periods can be secured as the response margin time in each area Ar.

Also in this case, the phase modulation driving of each area Ar starts from a timing before the incident period of the corresponding light.

In order to implement the operation as the third embodiment as described above, the control unit 8B illustrated in FIG. 16 performs control as follows.

That is, as control of the light source unit 2, for each frame period F, control is performed so that only the light emitting unit 2*r* is turned on in the first subframe period, only the light emitting unit 2*g* is turned on in the second subframe period, only the light emitting unit 2*b* is turned on in the third subframe period, and only the light emitting unit 2*g* is turned on in the fourth subframe period.

Note that, since the control of each light shift unit 20 has been described above, redundant description is avoided.

Furthermore, in each frame period F, the area phase distributions DpdR, DpdG, and DpdB are calculated on the basis of the input image data. At this time, since the color assigned to each area Ar changes over time in the third embodiment, the lens components Dpl (see FIG. 9) to be used for generating the area phase distributions DpdR, DpdG, and DpdB are selected according to the rule of the change.

Moreover, as drive control of the phase modulation SLM 3, phase modulation driving based on the corresponding area phase distribution Dpd is started at a timing before the light incident period from the light emitting unit of the corresponding color for each of the first area Ar1, the second area Ar2, and the third area Ar3.

Figure 20:
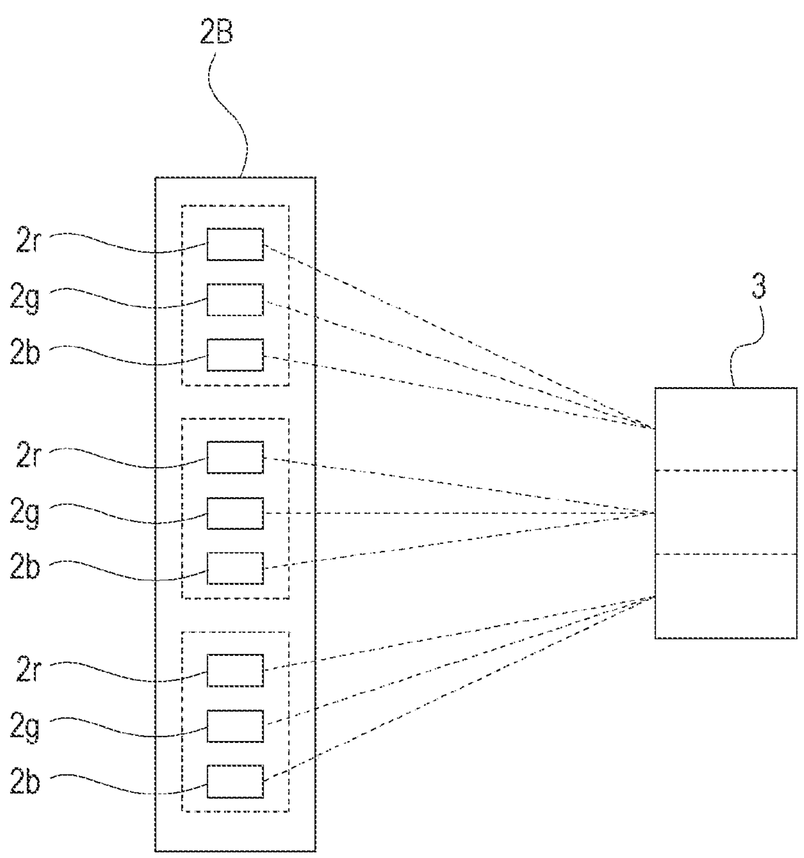
FIG. 20 is an explanatory diagram of another example of a light source unit in the third embodiment.

Note that, in the third embodiment, the light shift unit 20 does not have to be provided. For example, as illustrated in FIG. 20, the light source unit 2B including three sets of the light emitting unit 2*r*, the light emitting unit 2*g*, and the light emitting unit 2*b* is provided instead of the light source unit 2.

Thus, it is possible to switch which light of R, G, and B is made incident on each area Ar in the phase modulation SLM 3 depending on which of the light emitting unit 2*r*, the light emitting unit 2*g*, and the light emitting unit 2*b* is turned on in each set.

4. Fourth Embodiment

Figure 21:
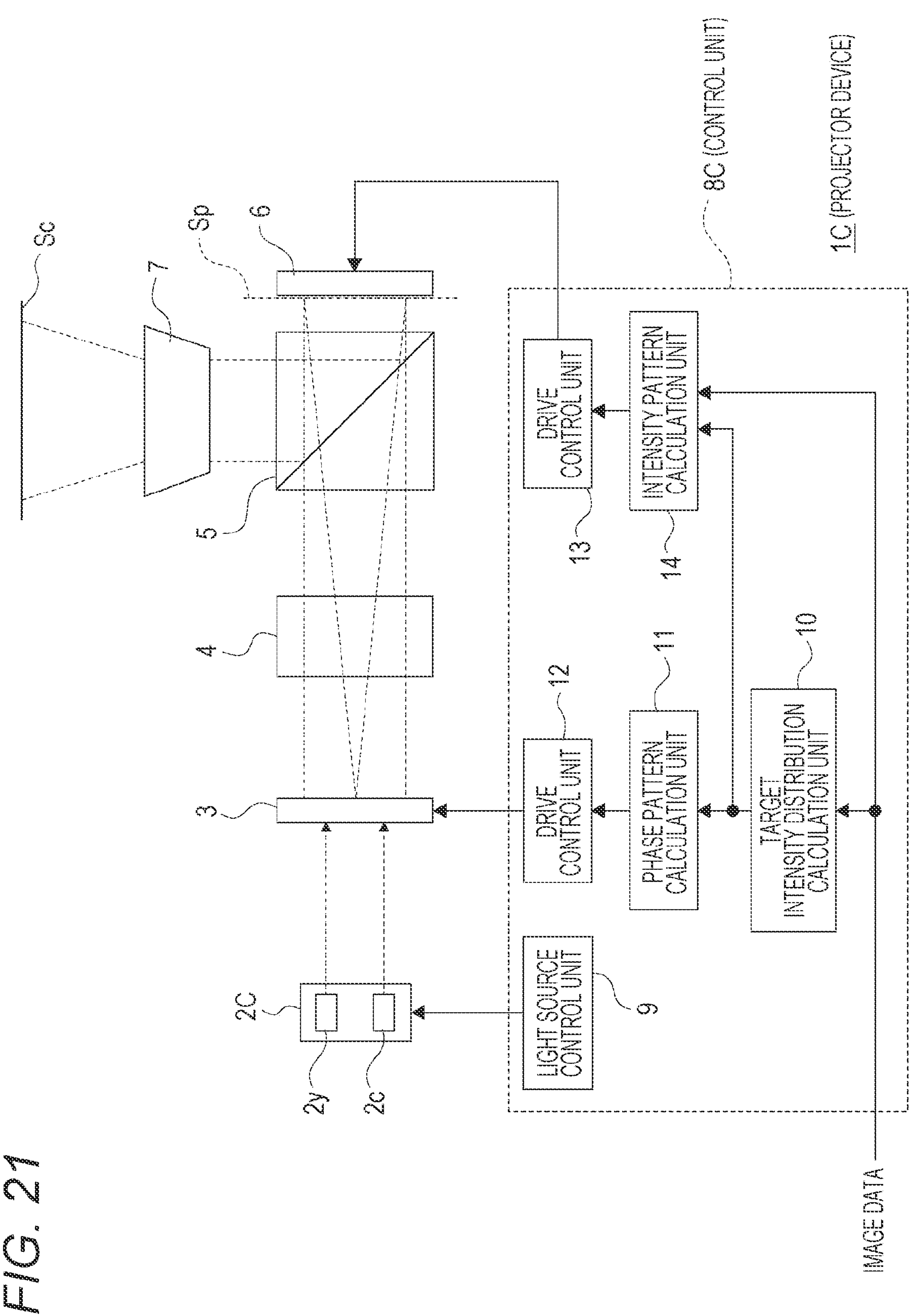
FIG. 21 is a diagram illustrating a configuration example of an illumination device as a fourth embodiment.

FIG. 21 is a diagram illustrating a configuration example of a projector device 1C as a fourth embodiment.

The projector device 1C is different from the projector device 1 of the first embodiment in that a light source unit 2C is provided instead of the light source unit 2, and a control unit 8C is provided instead of the control unit 8.

As illustrated in the drawing, the light source unit 2C includes a light emitting unit 2*y* that emits Y light and a light emitting unit 2*c* that emits C (cyan) light that is a composite color of G and B.

In the fourth embodiment, the number of area divisions of the phase modulation SLM 3 is two, and respective areas Ar are set as a first area Ar1 and a second area Ar2. The Y light emitted from the light emitting unit 2*y* is incident on the first area Ar1, and the C light emitted from the light emitting unit 2*c* is incident on the second area Ar2.

In the fourth embodiment, similarly to the third embodiment, one frame period includes four subframe periods, and the intensity modulation SLM 6 performs spatial light intensity modulation on four subframe images of R, G, B, and G within one frame period also in this case. Similarly to the case of the third embodiment, it is assumed that the first subframe period is the head of the frame period F, followed by the second, third, and fourth subframe periods, and in this case, the intensity modulation SLM 6 performs spatial light intensity modulation of the subframe image in each frame period F with allocation of the first subframe period=R, the second subframe period=G, the third subframe period=B, and the fourth subframe period=G.

FIG. 22 is an explanatory diagram of a control method as a fourth embodiment.

In this case, in each frame period F, only the light emitting unit 2*y* is caused to emit light in the light source unit 2C in the first subframe period (R) and the second subframe period (G), and only the light emitting unit 2*c* is caused to emit light in the light source unit 2C in the third subframe period (B) and the fourth subframe period (G).

In the fourth embodiment, the first area Ar1 is assigned to phase modulation corresponding to the Y image in the first and second subframe periods, and the second area Ar2 is assigned to phase modulation corresponding to the C image in the third and fourth subframe periods.

In this case, the third and fourth subframe periods not assigned to phase modulation are secured as the response margin time in the first area Ar1, and the first and second subframe periods not assigned to phase modulation are secured as the response margin time in the second area Ar2.

Therefore, in the fourth embodiment, for the first area Ar1, the phase modulation driving for reproduced image generation corresponding to the Y image is started at a timing before the light incident period (first and second subframe periods) from the light emitting unit 2*y*. Similarly, for the second area Ar2, the phase modulation driving for reproduced image generation corresponding to the C image is started at a timing before the light incident period (third and fourth subframe periods) from the light emitting unit 2*c*.

Also in this case, a response margin time (in this case, two subframe periods) is secured in each area Ar by area division, and the crosstalk between subframe images in the time direction can be reduced.

Furthermore, in the fourth embodiment, similarly to the case of the second embodiment, in the period in which the spatial light intensity modulation of the subframe images of R and G is performed (in this case, the first and second subframe periods), the light source of the Y light that is a composite color of R and G is caused to emit light, and reproduced image generation corresponding to the Y image is performed in the first area Ar1, so that it is possible to suppress a decrease in the sense of resolution of the subframe images of R and G.

Moreover, in the fourth embodiment, in the third and fourth subframe periods in which the spatial light intensity modulation of the subframe images of B and G is performed, the light source of the C light that is a composite color of B and G is caused to emit light, and reproduced image generation corresponding to the C image is performed in the second area Ar2, so that it is possible to suppress a decrease in the sense of resolution of the subframe images of G and B.

In order to implement the operation as the fourth embodiment as described above, the control unit 8C performs control as follows in each frame period F.

That is, as control of the light source unit 2C, control is performed so that only the light emitting unit 2*y* is turned on in the first and second subframe periods, and only the light emitting unit 2*c* is turned on in the third and fourth subframe periods.

Furthermore, in each frame period F, the area phase distribution DpdY corresponding to the Y image and the area phase distribution DpdC corresponding to the C image are calculated on the basis of the input image data.

Moreover, as drive control of the phase modulation SLM 3, the phase modulation driving based on the corresponding area phase distribution Dpd is started at a timing before the light incident period from the corresponding light emitting unit for each of the first area Ar1 and the second area Ar2.

Note that, in the fourth embodiment, as in a case of the second embodiment, it is also conceivable to use W that is a composite color of R, G, and B as the composite color.

5. Modifications

Here, the embodiments are not limited to the specific example described above, and configurations as various modifications can be employed.

For example, in the above description, the case of using one or two intensity modulation SLMs 6 has been illustrated, but area division driving of the phase modulation SLM 3 can also be applied in a case where what is called a three-plate type configuration including three intensity modulation SLMs is employed.

Figure 23:
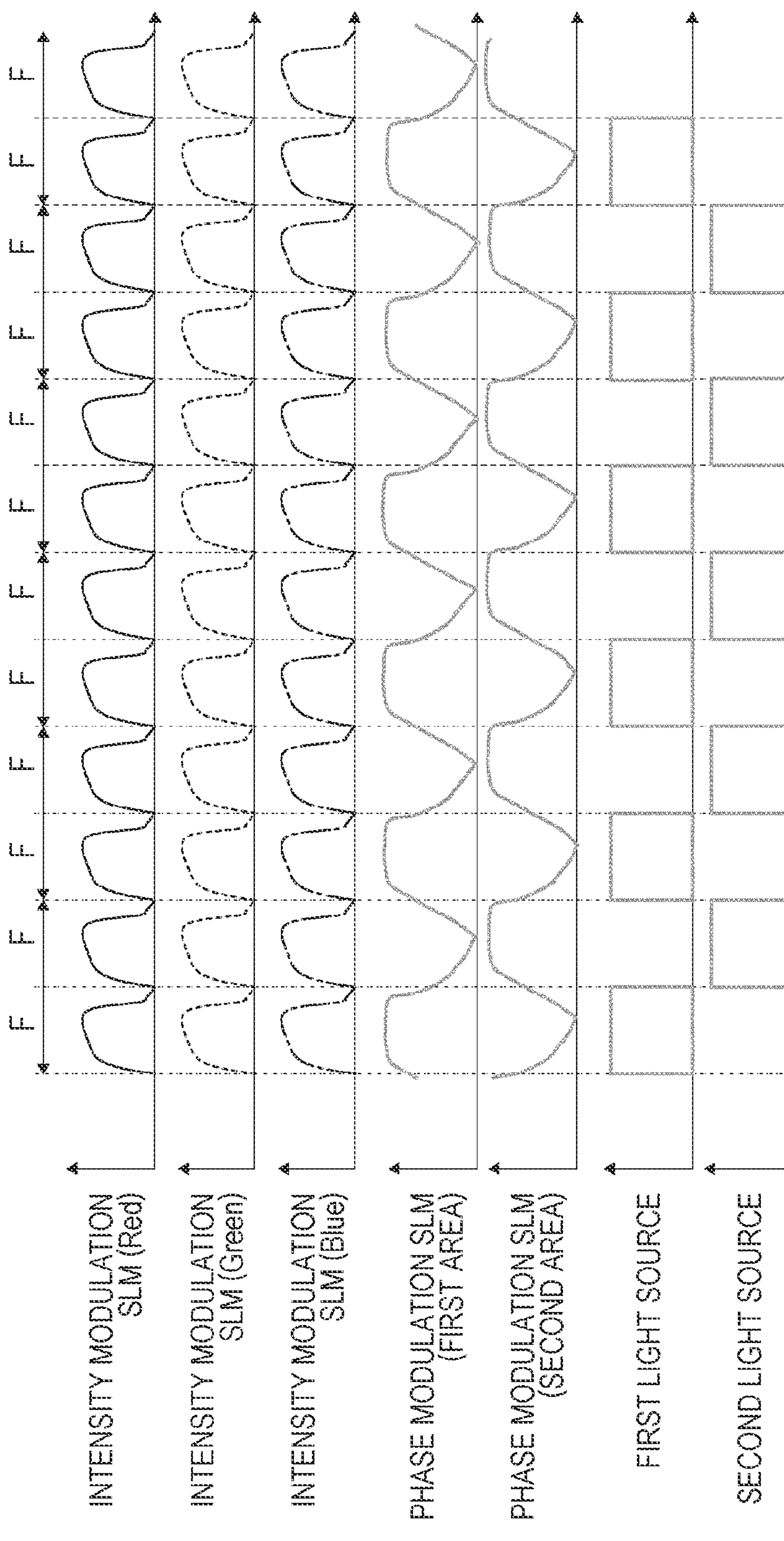
FIG. 23 is an explanatory diagram of an example of a control method corresponding to a case where a three-plate type configuration is employed.

FIG. 23 is an explanatory diagram of an example of a control method corresponding to a case where a three-plate type configuration is employed.

As illustrated, each intensity modulation SLM 6 performs spatial light intensity modulation for one different color among R, G, and B in each frame period F.

In this case, the phase modulation SLM 3 is divided into two areas, and respective areas Ar are set as a first area Ar1 and a second area Ar2. As illustrated, for example, the first area Ar1 is assigned to phase modulation corresponding to the W image in an even-numbered frame, and the second area Ar2 is assigned to phase modulation corresponding to the W image in an odd-numbered frame.

Light from the first light source is made incident on the first area Ar1 only in an even frame, and light from the second light source is made incident on the second area Ar2 only in an odd frame.

For example, by employing the control method as described above, it is possible to secure a response margin time for one frame period in each area Ar corresponding to a case where the three-plate type configuration is employed.

In this case, in each area Ar, the phase modulation driving can be started from the head timing of the frame period F immediately before the frame period F that is the light incident period, so that the crosstalk of the projected image in the time direction can be reduced.

Furthermore, in the above description, the number of divisions of the area Ar is three at the maximum, but the number of divisions of the area Ar may be four or more.

Figure 24:
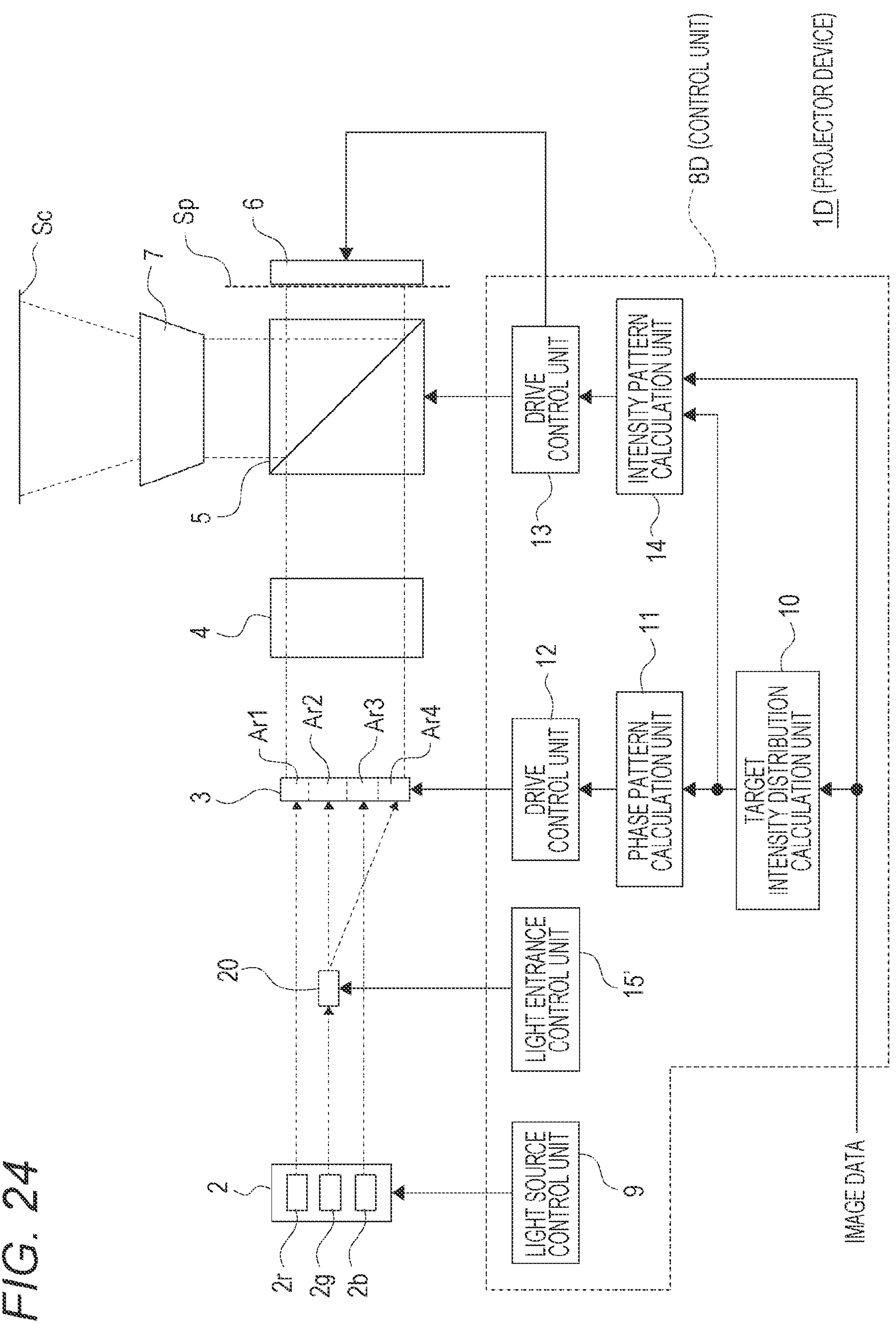
FIG. 24 is a diagram illustrating a configuration example of an illumination device as a modification in which the number of area divisions is 4.

FIG. 24 illustrates a configuration example of a projector device 1D as a modification in which the number of divisions of the area Ar is 4. Note that, hereinafter, the four areas Ar are referred to as a first area Ar1, a second area Ar2, a third area Ar3, and a fourth area Ar4.

It is different from the projector device 1 of the first embodiment in that a control unit 8D is provided instead of the control unit 8, and a light shift unit 20 is provided for the light emitting unit 2*g*. The control unit 8D is different from the control unit 8 in that a light entrance control unit 15' that controls the light shift unit 20 is provided.

Figure 25:
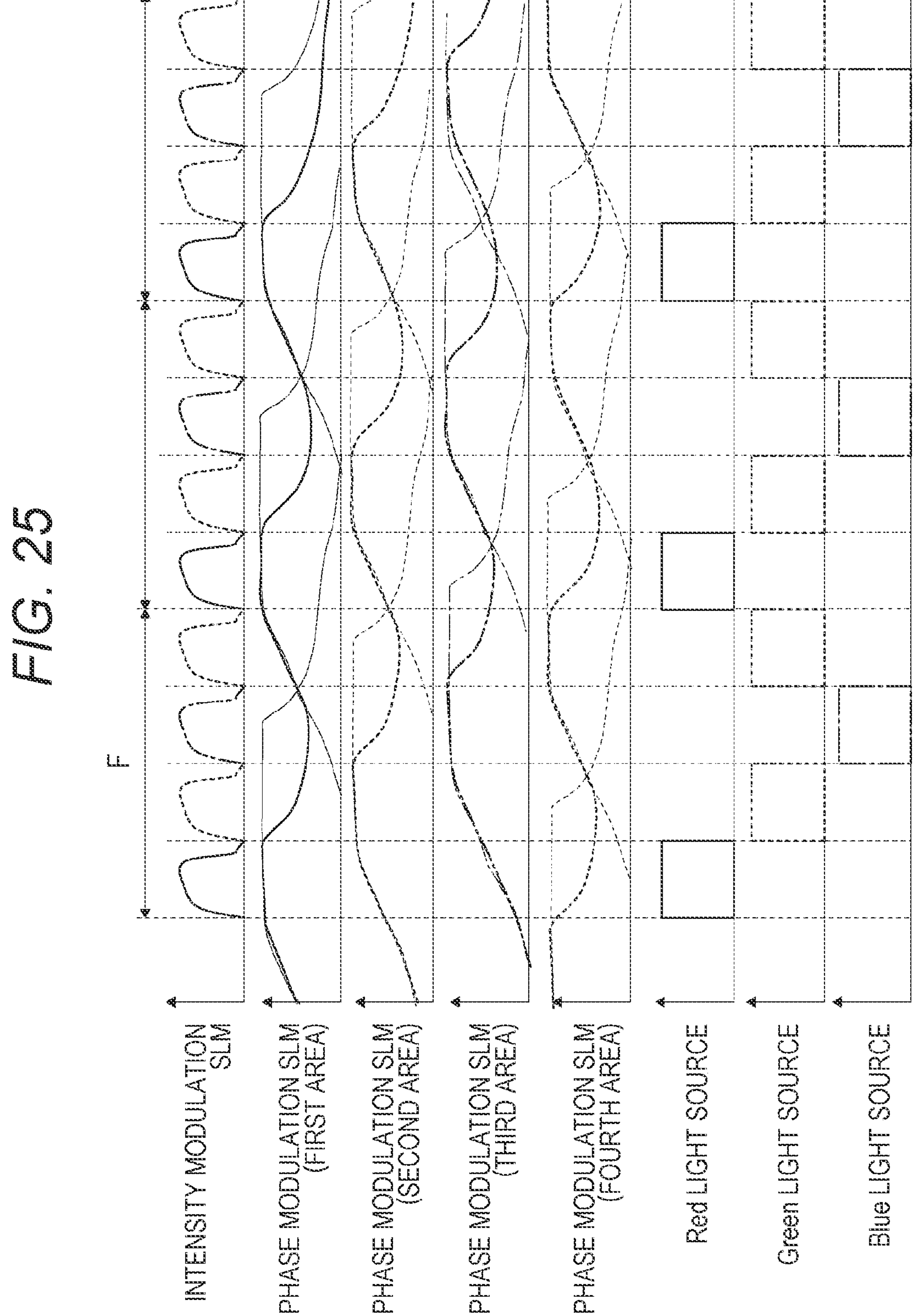
FIG. 25 is an explanatory diagram of an example of a control method in the illumination device illustrated in FIG. 24.

FIG. 25 is an explanatory diagram of an example of a control method in the projector device 1D.

In this case, similarly to the case of the fourth embodiment, the intensity modulation SLM 6 performs spatial light intensity modulation of the subframe image in each frame period F with allocation of the first subframe period=R, the second subframe period=G, the third subframe period=B, and the fourth subframe period=G.

In the present modification, since the number of areas Ar is four, one area Ar can be allocated to each of the first to fourth subframe periods.

Specifically, in this case, the first area Ar1 is assigned to phase modulation corresponding to the R image in the first subframe period (R), and the second area Ar2 is assigned to phase modulation corresponding to the G image in the second subframe period (G). Furthermore, the third area Ar3 is assigned to phase modulation corresponding to the B image in the third subframe period (B), and the fourth area Ar4 is assigned to phase modulation corresponding to the G image in the fourth subframe period (G).

In this case, since the G light needs to be incident on the second area Ar2 in the second subframe period and to be incident on the fourth area Ar4 in the fourth subframe period, the light shift unit 20 is provided for the light emitting unit 2*g* as illustrated in FIG. 24.

As can be seen with reference to FIG. 25, the response margin time in each area Ar can be expanded by increasing the number of area divisions. Therefore, the crosstalk reduction effect in the time direction between the subframe images can be enhanced.

Here, the number of area divisions of the phase modulation SLM 3 can be larger than the number of subframes. By making the number of area divisions larger than the number of subframes, a modulation drive interval of each area Ar can be made longer than one frame period, which can be further advantageous in terms of reduction of the crosstalk in the time direction.

Furthermore, the area division of the phase modulation surface Sm is not limited to equal division.

Figure 26:
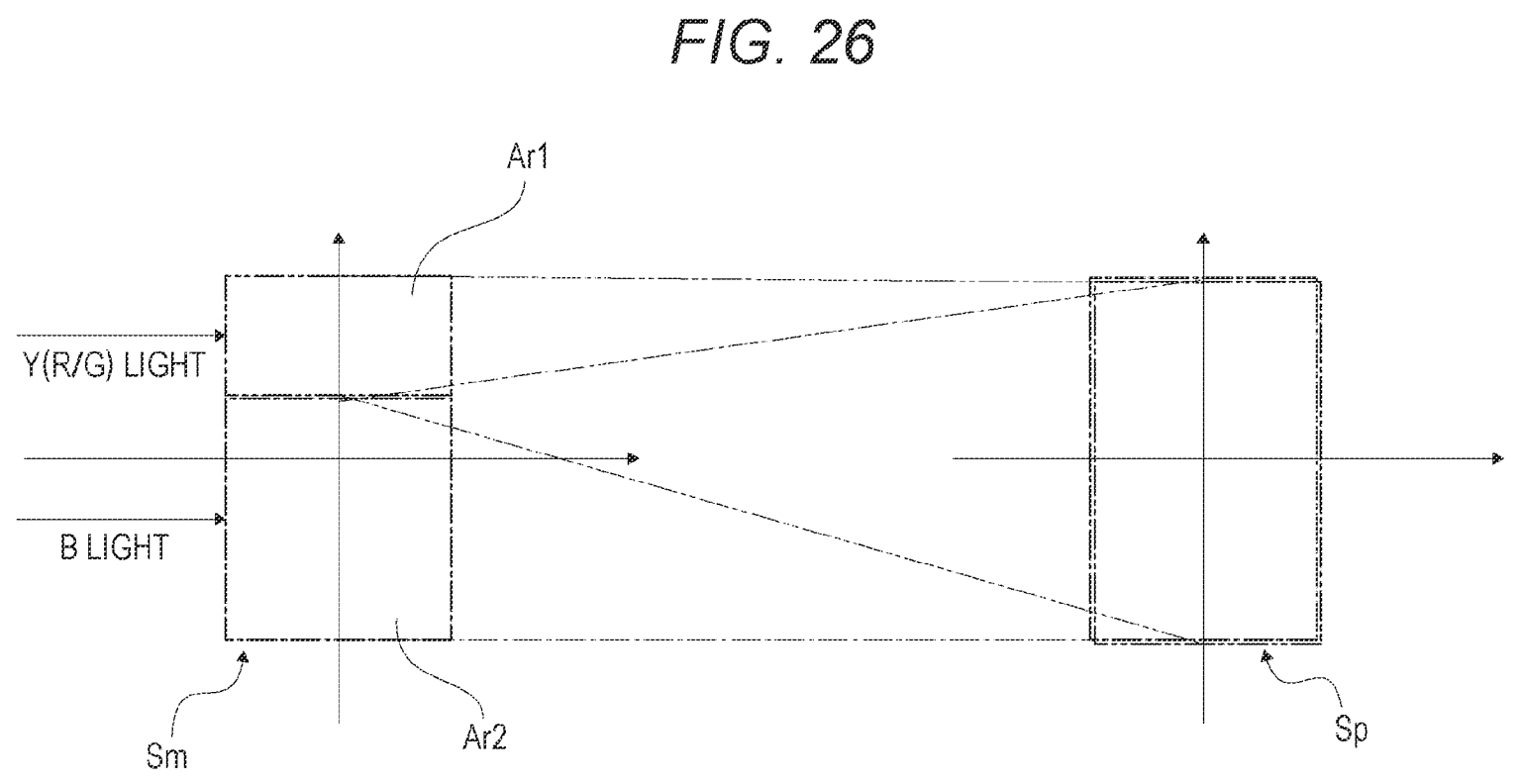

For example, as illustrated in FIG. 26, in a case where Y and B are used as the light source and the phase modulation surface Sm is divided into the first area Ar1 corresponding to the Y light and the second area Ar2 corresponding to the B light, it is conceivable to make the size of the second area Ar2 larger than that of the first area Ar1.

Thus, light density can be reduced in the blue light area where blue light having a short wavelength is incident, and the reliability of the projector device can be improved.

Furthermore, although not illustrated, in a case where R, G, and B are used as the light source and the phase modulation surface Sm is divided into three as in the first embodiment and the like, the size of the area Ar on which the R light is incident can be made larger than the area Ar on which the G light is incident and the area Ar on which the B light is incident.

Since a red laser light emitting element, which has been mass-produced in recent years, has a small output of a single emitter, a multi-emitter laser light emitting element in which two or more emitters are mounted in one chip is generally used. When this is used, etendue as a light source becomes large, and thus efficiency at the time of transmitting through the optical system and the phase modulation SLM 3 decreases. Furthermore, in order to obtain white balance for the projected image, the energy ratio of the R light is larger than that of the G and B light. Therefore, by increasing the area Ar of the R light as described above, it is possible to improve the efficiency and the resolution of the illumination light on the intensity modulation surface Sp.

Note that the method of performing uneven division as the area division of the phase modulation surface Sm as described above can also be suitably applied to a case of performing switching of the light incident area as described in the third embodiment. In this case, it is sufficient if the area Ar for increasing the size is switched in conjunction with the switching of the light incident area.

Furthermore, how to lay out the areas Ar of the respective colors can be appropriately selected according to an actual embodiment or the like.

Figure 27:
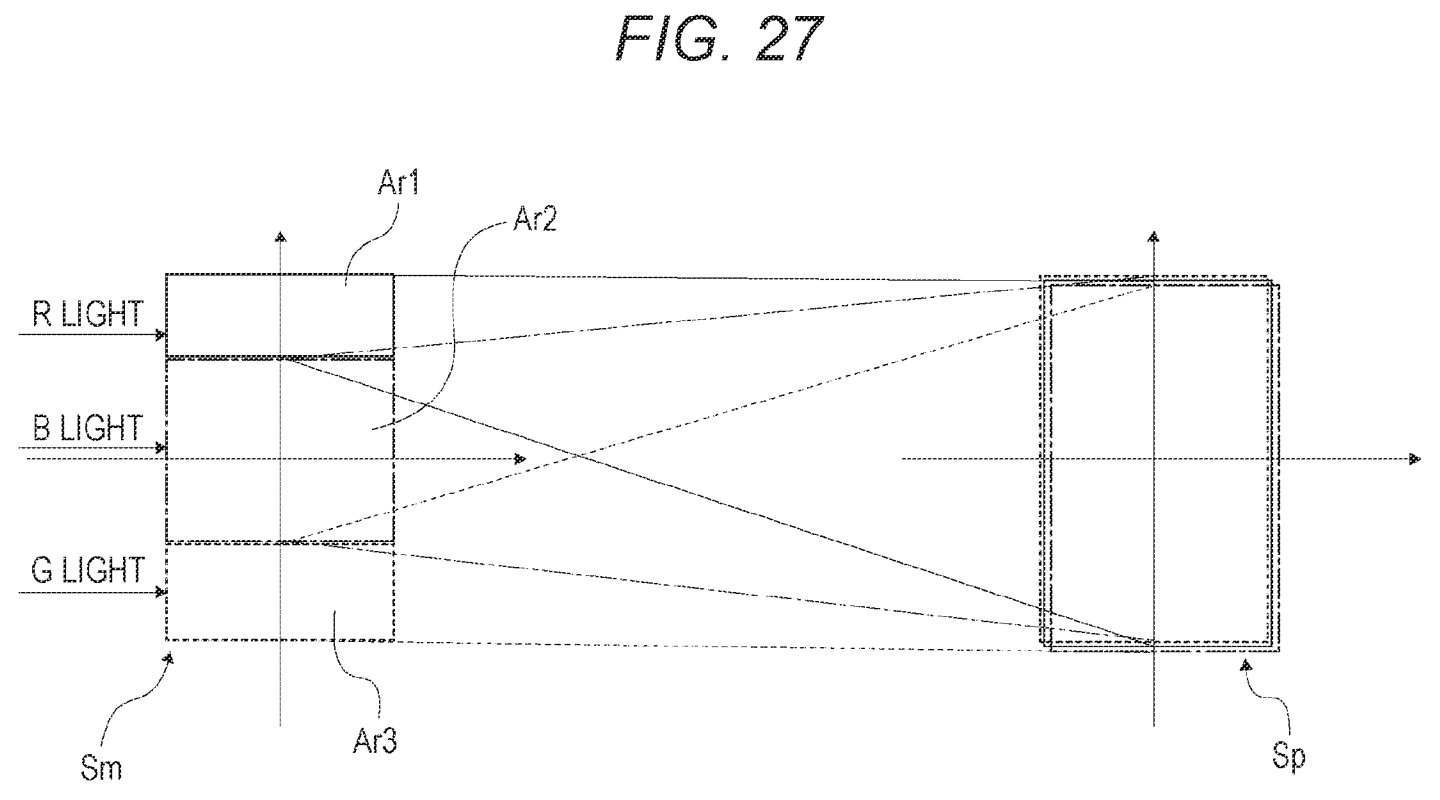

For example, in a case where R, G, and B are used as the light source and the phase modulation surface Sm is divided into three as in the first embodiment, it is conceivable to position the area Ar (the second area Ar2 in the drawing) on which the B light is incident inside the other area Ar (in the drawing, the first area Ar1 and the third area Ar3 are illustrated) as illustrated in FIG. 27.

The maximum angle at which the B light beam having a short wavelength is bent by the phase modulation pattern is smaller than that of the R light beam having a long wavelength, and when the B light beam is bent largely, the efficiency of the B light beam is further reduced. Thus, by disposing as illustrated in FIG. 27, that is, by disposing the area Ar of the B light at a position close to the optical axis, a decrease in efficiency can be suppressed. At this time, in order to adjust the white balance, the area Ar of the B light can be made larger than other areas Ar (the areas Ar of R light and G light) as illustrated in the drawing.

Furthermore, in the above description, an example is described in which a transmissive SLM is used as the phase modulation SLM 3, but the reflective phase modulation SLM 3' can also be used as the phase modulation SLM 3. As the reflective phase modulation SLM 3', for example, a reflective liquid crystal panel, a digital micromirror device (DMD), or the like can be used.

Figure 28:
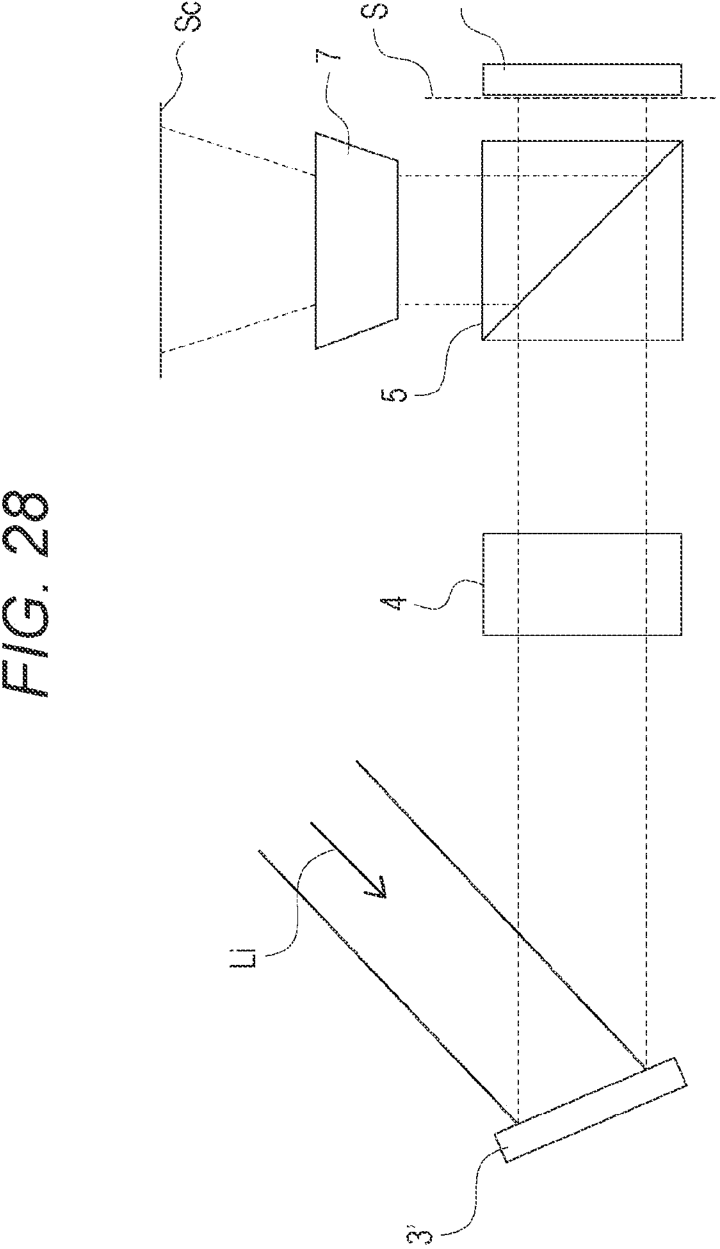
FIG. 28 is a diagram illustrating a schematic configuration example of an optical system in a case where a reflective phase modulation unit is used.

FIG. 28 illustrates a schematic configuration example of an optical system in a case where the phase modulation SLM 3' is used.

As illustrated, in this case, the incident light Li from the light source unit 2 (which may be the light source units 2A to 2C) is incident on the phase modulation SLM 3', and spatial light phase modulation is performed. Then, the light after the spatial light phase modulation is incident on the relay optical system 4 as reflected light from the phase modulation SLM 3'. Note that, although a configuration similar to that in FIGS. 1, 16, 21, and 24 is illustrated as the configuration subsequent to the relay optical system 4, the configuration illustrated in FIG. 12 can also be applied.

By using the reflective spatial light phase modulator, the thickness of the phase modulation unit (the thickness of the liquid crystal layer) needed to implement the same phase modulation amount can be suppressed to about half as compared with the case of using the transmissive spatial light phase modulator, and the response speed of the phase modulation can be improved.

Furthermore, the configuration of the optical system is not limited to the configuration illustrated above.

Figure 29:
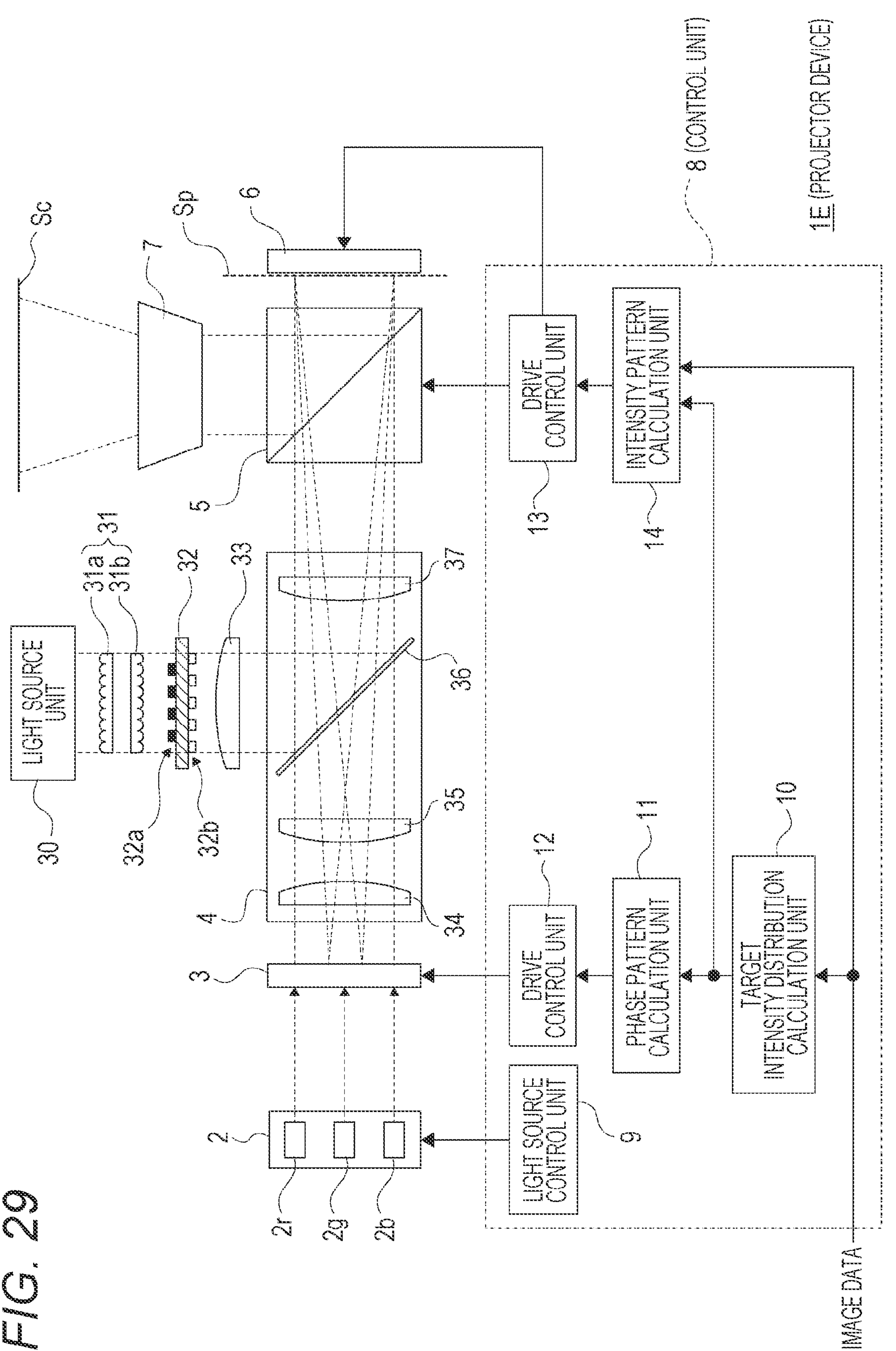
FIG. 29 is a diagram illustrating a configuration of an illumination device as a modification to which an SDR light source is added.

For example, as illustrated in FIG. 29, a configuration can be employed in which a light source unit 30 as a standard dynamic range (SDR) light source is added. The luminance of the entire projected image is increased by using not only the illumination light by the phase modulation SLM 3 but also the light from the light source unit 30.

Specifically, in this case, the light from the light source unit 30 is incident on a polarization conversion element 32 through an integrator optical system 31 including a first fly-eye lens 31*a* and a second fly-eye lens 31*b*. As illustrated in the drawing, in the polarization conversion element 32, an opening aperture 32*a* is formed on the surface on the side on which the light from the light source unit 30 is incident, and a half-wave plate 32*b* is formed on the light emission surface side. With the integrator optical system 31 and the polarization conversion element 32 as described above, illuminance uniformity of the light from the light source unit 30 on the irradiation surface can be improved.

As illustrated, in the relay optical system 4 in this case, light from the phase modulation SLM 3 is incident on the prism 5 via condenser lenses 34 and 35, a multiplexing element 36, and a condenser lens 37. The light from the light source unit 30 is multiplexed with the illumination light from the phase modulation SLM 3 by the multiplexing element 36 arranged in the relay optical system 4 via a condenser lens 33 after passing through the integrator optical system 31 and the polarization conversion element 32 described above, and is incident on the prism 5 together with the illumination light, so that the intensity modulation surface Sp is irradiated with the light.

Figures 30A, 30B, 30C, 30D:
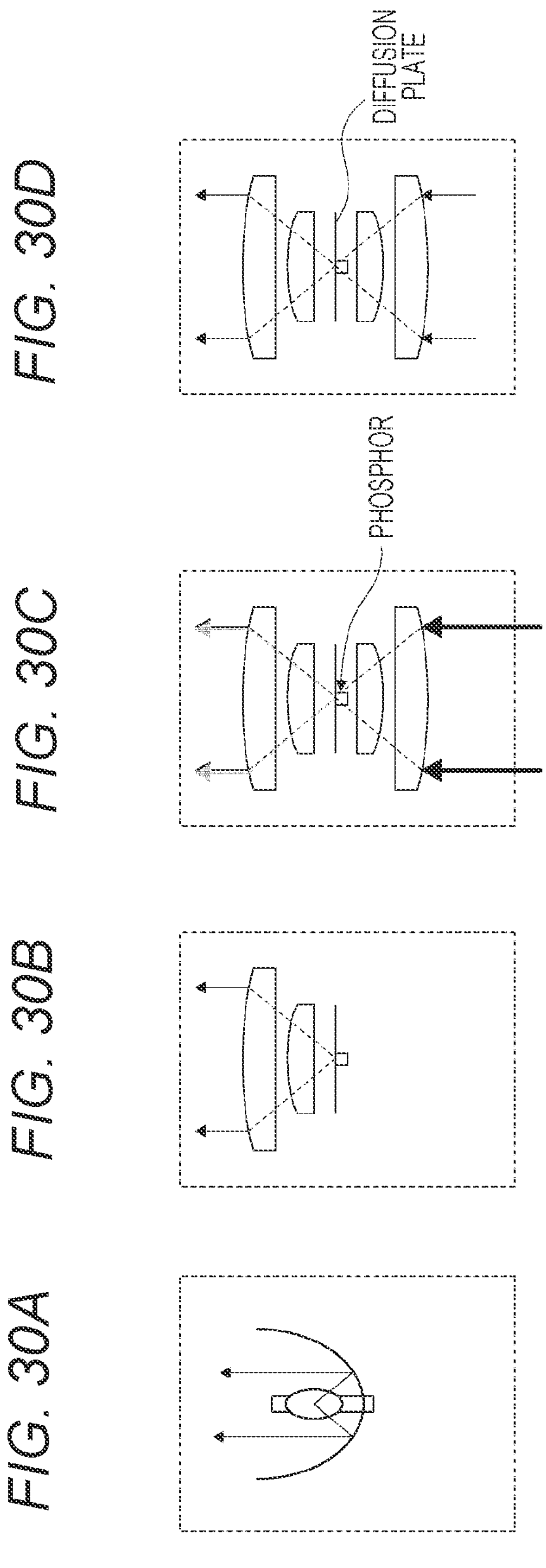
FIG. 30A is an explanatory diagram of a configuration example of an SDR light source.
FIG. 30B is an explanatory diagram of a configuration example of an SDR light source.
FIG. 30C is an explanatory diagram of a configuration example of an SDR light source.
FIG. 30D is an explanatory diagram of a configuration example of an SDR light source.

Here, the light source unit 30 may have a configuration illustrated in FIGS. 30A to 30D, for example. FIG. 30A is a configuration example in a case where a lamp such as a UHP lamp (ultra-high pressure mercury lamp) is used, and FIG. 30B is a configuration example in a case where a light emitting diode (LED) is used. Furthermore, FIG. 30C illustrates a configuration example in which the excitation laser light source of B is used as a phosphor, and in this case, B light is made incident on the phosphor. FIG. 30D illustrates a configuration example in a case where the R, G, and B laser light emitting elements are used, and in this case, it is conceivable to have a configuration in which light from the laser light emitting elements is emitted via a diffusion plate as illustrated.

Furthermore, in the above description, an example has been described in which a reflective spatial light intensity modulator is used as the intensity modulation SLM 6. However, for example, as in a projector device 1F illustrated in FIG. 31, a configuration including an intensity modulation SLM 6' by a transmissive spatial light intensity modulator can be employed.

Furthermore, in the above description, an example has been described in which the illumination device according to the present technology is applied to the projector device, but the present technology can be widely and suitably applied to an illumination device that irradiates any target surface with a reproduced image to which a light intensity distribution is imparted by spatial light phase modulation by a phase modulation unit.

For example, use as an illumination device or the like that performs irradiation with distance measurement light in a distance measurement device, which irradiates an object with the distance measurement light such as infrared light, and performs distance measurement on the basis of a result of receiving the reflected light, such as a distance measurement device by a time of flight (ToF) method, is also possible.

Furthermore, in the above description, as an example of spatial light phase modulation for reproducing a desired light intensity distribution on the target surface, an example of performing spatial light phase modulation based on the freeform method, that is, spatial light phase modulation on the premise of use of a refraction phenomenon of light has been described. However, the present technology can also be suitably applied to a case where spatial light phase modulation is performed by a method on the premise of use of a diffraction phenomenon of light such as a computer-generated hologram (CGH).

6. Summary of Embodiments

As described above, an illumination device (projector device 1, 1B, 1C, 1D, 1E, or 1F) as an embodiment includes a light source unit (2, 2A, 2B, or 2C) including a light emitting unit (the same 2*r*, 2*g*, 2*b*, 2*y*, or 2*c*) that emits light, a phase modulation unit (phase modulation SLM 3 or 3') that performs spatial light phase modulation on incident light from the light source unit, and a control unit (the same 8, 8A, 8B, 8C, or 8D) that causes light from the light source unit to be incident on a plurality of areas (the same Ar) into which a phase modulation surface of the phase modulation unit is divided at different timings for each of the areas, and starts modulation driving at a timing before a light incident period for each of the areas.

Thus, the phase modulation unit can output a reproduced image that is different for each area in a time division manner.

Therefore, even if only one phase modulation unit is provided, a margin of response time is generated in each area, so that crosstalk of the reproduced image in the time direction can be reduced. That is, it is possible to achieve both downsizing of the optical system in that the number of phase modulation units can be reduced and reduction of the crosstalk of the reproduced image in the time direction.

Furthermore, in the illumination device as the embodiment, the phase modulation unit performs spatial light phase modulation for each of the areas in such a manner that a lens effect (lens component Dpl) for changing at least one of a direction or a light flux size of an emitted light flux from the area is imparted to each of the areas (see FIG. 9).

Thus, it is possible to match the position and size on the optical axis orthogonal plane for the reproduced image of each area obtained on a plane conjugate to the phase modulation surface.

Therefore, it is possible to reduce the crosstalk in the spatial direction with respect to the reproduced image by the phase modulation unit.

Moreover, in the illumination device as the embodiment, the phase modulation unit (phase modulation SLM 3') is a reflective spatial light phase modulator (see FIG. 28).

Thus, the thickness of the phase modulation unit needed to implement the same phase modulation amount can be suppressed to about half of that in a case of the transmissive spatial light phase modulator.

Therefore, the response speed of the phase modulation unit can be improved, and the crosstalk reduction effect in the time direction between the reproduced images can be improved.

Furthermore, the illumination device as the embodiment is configured as a projector device including an intensity modulation unit (intensity modulation SLM 6, 6-1, or 6-2) that performs spatial light intensity modulation on a reproduced image by the phase modulation unit, and a projection unit (projection lens 7) that projects the reproduced image on a target surface, the reproduced image being subjected to spatial light intensity modulation by the intensity modulation unit.

Thus, it is possible to implement a projector device in which utilization efficiency of light from the light source unit is improved as compared with a conventional projector device that generates a projected image only by spatial light intensity modulation by the intensity modulation unit.

Furthermore, in the illumination device as the embodiment, the number of divisions of the areas in the phase modulation unit is equal to or more than the number of subframes in one frame (see FIG. 1, FIG. 24, or the like).

Thus, each area does not have to be assigned to at least any of the subframes.

Therefore, in each area, since the modulation driving can be started before the start of the period of the assigned subframe, the response can be completed in the assigned period, and the crosstalk of the projected image in the time direction can be reduced.

Moreover, in the illumination device as the embodiment, the number of divisions of the areas in the phase modulation unit is equal to the number of subframes (see FIG. 1, FIG. 24, or the like).

Thus, the modulation drive interval of each area can be set to one frame interval.

Therefore, in each area, the response can be completed in the assigned period, and the crosstalk of the projected image in the time direction can be reduced.

Furthermore, in the illumination device as the embodiment, there are subframes of three or more colors as subframes, and the control unit causes light of a composite color of at least two colors to be incident on one of the areas from the light source unit, and causes spatial light phase modulation to be executed with a modulation pattern corresponding to the composite color in a spatial light intensity modulation period by the intensity modulation unit for subframes of at least the two colors (see FIG. 14, FIG. 15, FIG. 22, and the like).

Assuming that there are subframes of three or more colors as the subframe, by causing one area to execute phase modulation with a modulation pattern corresponding to the composite color of at least two colors in the intensity modulation period for subframes of at least the two colors as described above, it is possible to lengthen the response margin time in the area as compared with a case where the one area is assigned to phase modulation of the two colors.

Therefore, the crosstalk in the time direction of the projected image can be reduced.

Furthermore, the illumination device as the embodiment includes two of the intensity modulation units, in which a number of divisions of the areas in the phase modulation unit is two, one of the intensity modulation units performs spatial light intensity modulation of a subframe of red in a first subframe period and spatial light intensity modulation of a subframe of blue in a second subframe period within one frame period, another of the intensity modulation units performs spatial light intensity modulation of a subframe of green in the first subframe period and spatial light intensity modulation of a subframe of blue in the second subframe period, and the control unit (8A) causes yellow light that is a composite color of red and green to be incident on one of the areas of the phase modulation unit from the light source unit, and causes spatial light phase modulation to be executed with a modulation pattern corresponding to yellow in the first subframe period, and causes blue light to be incident on another of the areas of the phase modulation unit from the light source unit, and causes spatial light phase modulation to be executed with a modulation pattern corresponding to blue in the second subframe period (see FIG. 14).

Thus, it is possible to reduce the crosstalk in the time direction of the projected image corresponding to a case where one intensity modulation unit performs intensity modulation of the subframes of red and blue and the other intensity modulation unit performs the intensity modulation of the subframes of green and blue in one frame period using the subframes of three colors of red, blue, and green.

Moreover, in the illumination device as the embodiment, the intensity modulation unit performs spatial light intensity modulation of red in a first subframe period within one frame period, performs spatial light intensity modulation of a subframe of green in a second subframe period consecutive to the first subframe period, performs spatial light intensity modulation of blue in a third subframe period, and performs spatial light intensity modulation of a subframe of green in a fourth subframe period consecutive to the third subframe period, and the number of divisions of the area in the phase modulation unit is two, and the control unit (the same 8C) causes yellow light that is a composite color of red and green to be incident on one of the areas of the phase modulation unit from the light source unit, and causes spatial light phase modulation to be executed with a modulation pattern corresponding to yellow in the first subframe period and the second subframe period, and causes cyan light that is composite light of blue and green to be incident on another of the areas of the phase modulation unit from the light source unit, and causes spatial light phase modulation to be executed with a modulation pattern corresponding to cyan in the third subframe period and the fourth subframe period (see FIG. 22).

Thus, it is possible to reduce the crosstalk in the time direction of the projected image corresponding to a case where a single intensity modulation unit performs intensity modulation of the subframes of red, green, blue, and green in one frame period using the subframes of three colors of red, blue, and green.

Furthermore, in the illumination device as the embodiment, there are subframes of three colors of red, blue, and green as the subframes, and the control unit causes spatial light phase modulation to be executed on at least the one area with a modulation pattern corresponding to white that is a composite color of red, blue, and green (see FIG. 15).

Thus, it is possible to extend the response margin time in one area as compared with a case where phase modulation of a single color or two colors is assigned to the area.

Therefore, the crosstalk in the time direction of the projected image can be reduced.

Furthermore, in the illumination device as the embodiment, the light source unit includes a plurality of light emitting units having different emission colors, and the illumination device includes a light incident area switching unit (light shift unit 20 and light entrance control units 15 and 15') that switches the area on which light is incident for at least one of the light emitting units (see FIGS. 16 and 24).

Thus, it is possible to switch which area and at which timing light is made to be incident for the light emitting units of at least one color.

Therefore, in a case where it is demanded to cause light of a specific color to be incident on another area at another timing, it is not necessary to provide a light emitting unit of the specific color for each area, and the light source unit can be downsized.

Moreover, in the illumination device as the embodiment, the light incident area switching unit switches the area on which light is incident for all the light emitting units in the light source unit (see FIGS. 16 and 19).

Thus, it is possible to switch at which timing the light is made incident on which area for the light emitting unit of each color.

Therefore, in order to switch which color light is incident at which timing for each area, it is not necessary to provide a light emitting unit of each color for each area, and the light source unit can be downsized.

Furthermore, in the illumination device as the embodiment, the plurality of areas is obtained by unevenly dividing the phase modulation surface (see FIGS. 26 and 27). Thus, an area used for phase modulation of light of a certain color and an area used for phase modulation of light of another color can be made different in size.

Furthermore, in the illumination device as the embodiment, the phase modulation unit includes, as areas, a blue light area into which blue light is incident from the light source unit and a non-blue light area into which light having a longer wavelength than that of blue light is incident from the light source unit, and the size of the blue light area is made larger than the size of the non-blue light area.

Thus, light density can be reduced in the blue light area where blue light having a short wavelength is incident.

Therefore, the reliability of the illumination device can be improved.

Note that the example of unevenly dividing the phase modulation surface is not limited to the above example, and for example, in a case where R, G, and B are used as the light source and the phase modulation surface is divided into three as described above, the size of the area on which the R light is incident can be made larger than the area on which the G light is incident and the area on which the B light is incident.

By making the area of the R light large in this manner, efficiency can be improved.

Moreover, in the illumination device as the embodiment, the phase modulation unit includes, as areas, a blue light area into which blue light is incident from the light source unit and a non-blue light area into which light having a longer wavelength than that of blue light is incident from the light source unit, and the blue light area is located inside the non-blue light area (FIG. 27).

Thus, the blue light area is arranged at a position closer to the optical axis than the non-blue light area having a longer wavelength.

Therefore, it is possible to suppress the bending amount of the light flux due to the phase modulation for blue light having a short wavelength, and to improve light utilization efficiency for blue light.

Note that the effects described in the present specification are merely examples and are not limited, and other effects may be provided.

7. Present Technology

The present technology can also employ the following configurations.

(1)

An illumination device, including:

a light source unit including a light emitting unit that emits light;

a phase modulation unit that performs spatial light phase modulation on incident light from the light source unit; and a control unit that causes light from the light source unit to be incident on a plurality of areas into which a phase modulation surface of the phase modulation unit is divided at different timings for each of the areas, and starts modulation driving at a timing before a light incident period for each of the areas.

(2)

The illumination device according to (1), in which the phase modulation unit performs spatial light phase modulation for each of the areas in such a manner that a lens effect for changing at least one of a direction or a light flux size of an emitted light flux from the area is imparted to each of the areas.

(3)

The illumination device according to (1) or (2) above, in which the phase modulation unit is a reflective spatial light phase modulator.

(4)

The illumination device according to any one of (1) to (3) above, in which the illumination device is configured as a projector device including an intensity modulation unit that performs spatial light intensity modulation on a reproduced image by the phase modulation unit, and a projection unit that projects the reproduced image on a target surface, the reproduced image being subjected to spatial light intensity modulation by the intensity modulation unit.

(5)

The illumination device according to (4) above, in which a number of divisions of the areas in the phase modulation unit is equal to or more than a number of subframes in one frame.

(6)

The illumination device according to (5) above, in which the number of divisions of the areas in the phase modulation unit is equal to the number of subframes.

(7)

The illumination device according to (4) above, in which there are subframes of three or more colors as subframes, and the control unit causes light of a composite color of at least two colors to be incident on one of the areas from the light source unit, and causes spatial light phase modulation to be executed with a modulation pattern corresponding to the composite color in a spatial light intensity modulation period by the intensity modulation unit for subframes of at least the two colors.

(8)

The illumination device according to (7) above, further including:

two of the intensity modulation units, in which a number of divisions of the areas in the phase modulation unit is two, one of the intensity modulation units performs spatial light intensity modulation of a subframe of red in a first subframe period and spatial light intensity modulation of a subframe of blue in a second subframe period within one frame period, another of the intensity modulation units performs spatial light intensity modulation of a subframe of green in the first subframe period and spatial light intensity modulation of a subframe of blue in the second subframe period, and the control unit causes yellow light that is a composite color of red and green to be incident on one of the areas of the phase modulation unit from the light source unit, and causes spatial light phase modulation to be executed with a modulation pattern corresponding to yellow in the first subframe period, and causes blue light to be incident on another of the areas of the phase modulation unit from the light source unit, and causes spatial light phase modulation to be executed with a modulation pattern corresponding to blue in the second subframe period.

(9)

The illumination device according to (7) above, in which the intensity modulation unit performs spatial light intensity modulation of red in a first subframe period within one frame period, performs spatial light intensity modulation of a subframe of green in a second subframe period consecutive to the first subframe period, performs spatial light intensity modulation of blue in a third subframe period, and performs spatial light intensity modulation of a subframe of green in a fourth subframe period consecutive to the third subframe period, and a number of divisions of the area in the phase modulation unit is two, and the control unit causes yellow light that is a composite color of red and green to be incident on one of the areas of the phase modulation unit from the light source unit, and causes spatial light phase modulation to be executed with a modulation pattern corresponding to yellow in the first subframe period and the second subframe period, and causes cyan light that is composite light of blue and green to be incident on another of the areas of the phase modulation unit from the light source unit, and causes spatial light phase modulation to be executed with a modulation pattern corresponding to cyan in the third subframe period and the fourth subframe period.

(10)

The illumination device according to (7) above, in which there are subframes of three colors of red, blue, and green as the subframes, and the control unit causes spatial light phase modulation to be executed on at least the one area with a modulation pattern corresponding to white that is a composite color of red, blue, and green.

(11)

The illumination device according to any one of (4) to (6) above, in which the light source unit includes a plurality of light emitting units having different emission colors, and the illumination device further includes a light incident area switching unit that switches the area on which light is incident for at least one of the light emitting units.

(12)

The illumination device according to (11) above, in which the light incident area switching unit switches the area on which light is incident for all the light emitting units in the light source unit.

(13)

The illumination device according to any one of (1) to (12) above, in which the plurality of areas is obtained by unevenly dividing the phase modulation surface.

(14)

The illumination device according to (13) above, in which the phase modulation unit includes, as the areas, a blue light area on which blue light is incident from the light source unit and a non-blue light area on which light having a longer wavelength than blue light is incident from the light source unit, and a size of the blue light area is larger than a size of the non-blue light area.

(15)

The illumination device according to (2) above, in which the phase modulation unit includes, as the areas, a blue light area on which blue light is incident from the light source unit and a non-blue light area on which light having a longer wavelength than blue light is incident from the light source unit, and the blue light area is located inside the non-blue light area.

REFERENCE SIGNS LIST

1, 1B, 1C, 1D, 1E, 1F Projector device
2, 2A, 2B, 2C Light source unit
2*r*, 2*g*, 2*b*, 2*y*, 2*c* Light emitting unit
3, 3' Phase modulation SLM
4 Relay optical system
41, 43, 44 Lens
42 Diffusion plate
5 Prism
6, 6-1, 6-2, 6' Intensity modulation SLM
7 Projection lens
8, 8A, 8B, 8C, 8D Control unit
9 Light source control unit
10 Target intensity distribution calculation unit
11 Phase pattern calculation unit
12, 13 Drive control unit
14 Intensity pattern calculation unit
15, 15' Light entrance control unit
20 Light shift unit
20*a* Turning shaft
21, 22 Wedge-type optical element
Sp Intensity modulation surface
Sm Phase modulation surface
Sd Dummy surface
Ar Area
Ar1 First area
Ar2 Second area
Ar3 Third area
Dpr Basic phase distribution
Dpa, Dpa1, Dpa2, Dpa3 Area basic phase distribution
30 Light source unit
31 Integrator optical system
31*a* First fly-eye lens
31*b* Second fly-eye lens
32 Polarization conversion element
32*a* Opening aperture
32*b* Half-wave plate
33, 34, 35, 37 Condenser lens
36 Multiplexing element

What is claimed is:

1. An illumination device, comprising:

a light source unit including a light emitting unit that emits light;

a phase modulation unit that performs spatial light phase modulation on incident light from the light source unit; and a control unit that causes light from the light source unit to be incident on a plurality of areas into which a phase modulation surface of the phase modulation unit is divided at different timings for each of the areas, and starts modulation driving at a timing before a light incident period for each of the areas, wherein the light source unit includes a plurality of light emitting units, wherein light from a first one of the light emitting units is incident on a first area of the phase modulation surface during a first light incident period, wherein light from a second one of the light emitting units is incident on a second area of the phase modulation surface during a second light incident period.

2. The illumination device according to claim 1, wherein the phase modulation unit performs spatial light phase modulation for each of the areas in such a manner that a lens effect for changing at least one of a direction or a light flux size of an emitted light flux from the area is imparted to each of the areas.

3. The illumination device according to claim 1, wherein the phase modulation unit is a reflective spatial light phase modulator.

4. An illumination device, comprising:

a light source unit including a light emitting unit that emits light;

a phase modulation unit that performs spatial light phase modulation on incident light from the light source unit; and a control unit that causes light from the light source unit to be incident on a plurality of areas into which a phase modulation surface of the phase modulation unit is divided at different timings for each of the areas, and starts modulation driving at a timing before a light incident period for each of the areas, wherein the illumination device is configured as a projector device, including:

an intensity modulation unit that performs spatial light intensity modulation on a reproduced image by the phase modulation unit; and a projection unit that projects the reproduced image on a target surface, the reproduced image being subjected to spatial light intensity modulation by the intensity modulation unit.

5. The illumination device according to claim 4, wherein a number of divisions of the areas in the phase modulation unit is equal to or more than a number of subframes in one frame.

6. The illumination device according to claim 5, wherein the number of divisions of the areas in the phase modulation unit is equal to the number of subframes.

7. The illumination device according to claim 4, wherein there are subframes of three or more colors as subframes, and the control unit causes light of a composite color of at least two colors to be incident on one of the areas from the light source unit, and causes spatial light phase modulation to be executed with a modulation pattern corresponding to the composite color in a spatial light intensity modulation period by the intensity modulation unit for subframes of at least the two colors.

8. The illumination device according to claim 7, further comprising:

two of the intensity modulation units, wherein a number of divisions of the areas in the phase modulation unit is two, one of the intensity modulation units performs spatial light intensity modulation of a subframe of red in a first subframe period and spatial light intensity modulation of a subframe of blue in a second subframe period within one frame period, another of the intensity modulation units performs spatial light intensity modulation of a subframe of green in the first subframe period and spatial light intensity modulation of a subframe of blue in the second subframe period, and the control unit causes yellow light that is a composite color of red and green to be incident on one of the areas of the phase modulation unit from the light source unit, and causes spatial light phase modulation to be executed with a modulation pattern corresponding to yellow in the first subframe period, and causes blue light to be incident on another of the areas of the phase modulation unit from the light source unit, and causes spatial light phase modulation to be executed with a modulation pattern corresponding to blue in the second subframe period.

9. The illumination device according to claim 7, wherein the intensity modulation unit performs spatial light intensity modulation of red in a first subframe period within one frame period, performs spatial light intensity modulation of a subframe of green in a second subframe period consecutive to the first subframe period, performs spatial light intensity modulation of blue in a third subframe period, and performs spatial light intensity modulation of a subframe of green in a fourth subframe period consecutive to the third subframe period, and a number of divisions of the area in the phase modulation unit is two, and the control unit causes yellow light that is a composite color of red and green to be incident on one of the areas of the phase modulation unit from the light source unit, and causes spatial light phase modulation to be executed with a modulation pattern corresponding to yellow in the first subframe period and the second subframe period, and causes cyan light that is composite light of blue and green to be incident on another of the areas of the phase modulation unit from the light source unit, and causes spatial light phase modulation to be executed with a modulation pattern corresponding to cyan in the third subframe period and the fourth subframe period.

10. The illumination device according to claim 7, wherein there are subframes of three colors of red, blue, and green as the subframes, and the control unit causes spatial light phase modulation to be executed on at least the one area with a modulation pattern corresponding to white that is a composite color of red, blue, and green.

11. The illumination device according to claim 4, wherein the light source unit includes a plurality of light emitting units having different emission colors, and the illumination device further comprises a light incident area switching unit that switches the area on which light is incident for at least one of the light emitting units.

12. The illumination device according to claim 11, wherein the light incident area switching unit switches the area on which light is incident for all the light emitting units in the light source unit.

13. The illumination device according to claim 1, wherein the plurality of areas is obtained by unevenly dividing the phase modulation surface.

14. The illumination device according to claim 13, wherein the phase modulation unit includes, as the areas, a blue light area on which blue light is incident from the light source unit and a non-blue light area on which light having a longer wavelength than blue light is incident from the light source unit, and a size of the blue light area is larger than a size of the non-blue light area.

15. The illumination device according to claim 2, wherein the phase modulation unit includes, as the areas, a blue light area on which blue light is incident from the light source unit and a non-blue light area on which light having a longer wavelength than blue light is incident from the light source unit, and the blue light area is located inside the non-blue light area.

* * * * *